US007478583B2

(12) United States Patent
Scullion et al.

(10) Patent No.: US 7,478,583 B2
(45) Date of Patent: Jan. 20, 2009

(54) BEVERAGE

(75) Inventors: Simon Daniel Scullion, Staffordshire (GB); Peter Thomas Foster, Staffordshire (GB); Stephen Paul Smith, Derbyshire (GB)

(73) Assignee: Coors EMEA Properties, Inc., Lakewood, CO (US)

(*) Notice: Subject to any disclaimer, the term of this patent is extended or adjusted under 35 U.S.C. 154(b) by 427 days.

(21) Appl. No.: 10/150,463

(22) Filed: May 17, 2002

(65) Prior Publication Data

US 2003/0070446 A1 Apr. 17, 2003

Related U.S. Application Data

(63) Continuation-in-part of application No. 09/700,512, filed as application No. PCT/GB99/01551 on May 14, 1999, now Pat. No. 7,244,458.

(51) Int. Cl.
*C12G 3/00* (2006.01)

(52) U.S. Cl. .......................... 99/277; 99/278; 99/323.1; 99/517

(58) Field of Classification Search ........ 99/275–323.3, 99/451, 483, 467, 468, 330, 517; 426/238; 62/3.64, 333, 389, 391; 222/1, 173, 386.5, 222/183, 389, 399, 394, 420, 400.7, 146.6
See application file for complete search history.

(56) References Cited

U.S. PATENT DOCUMENTS

| | | | | |
|---|---|---|---|---|
| 3,826,829 | A | 7/1974 | Marulich | |
| 4,094,445 | A | 6/1978 | Bevan | |
| 5,464,124 | A | 11/1995 | Weyh et al. | |
| 5,709,095 | A | 1/1998 | Johnson | |
| 6,324,850 | B1 * | 12/2001 | Davis | 62/3.64 |
| 6,974,598 | B2 * | 12/2005 | Scullion et al. | 426/592 |

FOREIGN PATENT DOCUMENTS

| | | |
|---|---|---|
| EP | 0033560 | 1/1981 |
| EP | 0127686 | 12/1983 |
| EP | 0204899 | 3/1986 |

(Continued)

OTHER PUBLICATIONS

WPI Abstract Accession No. 93-312761 & DE 4305660.

(Continued)

*Primary Examiner*—Timothy F. Simone
(74) *Attorney, Agent, or Firm*—Baker Botts LLP

(57) ABSTRACT

A draught beverage (170) which may be alcoholic or non-alcoholic, for example a lager or cider in an open-topped drinking vessel or glass (172). The beverage comprises a water content and dissolved gas content. The draught beverage is dispensed from a font at a cooled temperature below the freezing point of water at ambient atmospheric pressure. The dispense temperature may be in the range of −1° C. to −12° C. The beverage in the glass may or may not be subjected to external excitement energy, for example ultra-sound, to encourage formation of nucleation sites in the beverage. Either way dissolved gas bubbles out of the beverage causing occurrence of nucleation sites at which ice (188A, 188B) from the water content forms. At least in part the ice has a slushy character. A head (174) also forms on the dispensed draught beverage and below the head the ice (188A, 188B) locates and develops downwards into the beverage.

11 Claims, 12 Drawing Sheets

FOREIGN PATENT DOCUMENTS

| | | | |
|---|---|---|---|
| EP | 0268097 | | 5/1988 |
| EP | 0336462 | | 3/1989 |
| EP | 0584127 | | 5/1992 |
| EP | 0683223 | | 11/1995 |
| EP | 0683224 | | 11/1995 |
| EP | 0919519 | | 7/1998 |
| GB | 1208334 | | 2/1968 |
| GB | 2089322 | | 12/1980 |
| GB | 2172266 | | 3/1985 |
| GB | 2172876 | | 8/1985 |
| GB | 2167313 | | 11/1985 |
| GB | 2167388 | | 11/1985 |
| GB | 2180632 | | 9/1986 |
| GB | 2208918 | | 8/1988 |
| GB | 2213246 | | 12/1988 |
| GB | 2232400 | | 5/1989 |
| GB | 2228310 | | 2/1990 |
| GB | 2241054 | | 2/1990 |
| GB | 2255164 | | 11/1990 |
| GB | 2251863 | | 12/1991 |
| GB | 2260310 | | 7/1992 |
| GB | 2298181 | | 10/1994 |
| GB | 2289425 | | 5/1995 |
| GB | 2289477 | | 5/1995 |
| GB | 2318112 | | 5/1995 |
| GB | 2294884 | | 10/1995 |
| GB | 2297093 | | 10/1995 |
| GB | 2300146 | | 10/1995 |
| GB | 2308095 | | 10/1995 |
| GB | 2308570 | | 10/1995 |
| GB | 2294750 | | 11/1995 |
| GB | 2323153 | | 11/1995 |
| GB | 2314148 | | 6/1996 |
| GB | 2302403 | | 1/1997 |
| GB | 2309295 | | 1/1997 |
| GB | 2320318 | | 2/1997 |
| GB | 2312201 | | 4/1997 |
| GB | 2327748 | | 7/1997 |
| GB | 2326633 | | 6/1998 |
| GB | 2338544 | * | 12/1999 |
| GB | 2355060 | * | 4/2001 |
| GB | 2359065 | * | 8/2001 |
| GB | 2368114 A | * | 4/2002 |
| WO | WO 86/00064 | | 1/1986 |
| WO | WO 88/07972 | | 4/1988 |
| WO | WO 89/08074 | | 3/1989 |
| WO | WO 91/01635 | | 2/1991 |
| WO | WO 91/07085 | | 5/1991 |
| WO | WO 91/08978 | | 6/1991 |
| WO | WO 94/24039 | | 4/1994 |
| WO | WO 94/12427 | | 6/1994 |
| WO | WO 95/18764 | | 1/1995 |
| WO | WO 96/27298 | | 3/1996 |
| WO | WO 97/16962 | | 5/1997 |
| WO | WO 97/18879 | | 5/1997 |
| WO | WO 98/37011 | | 2/1998 |
| WO | WO 98/42612 | | 3/1998 |
| WO | WO 98/42613 | | 3/1998 |
| WO | WO 99/37578 | | 1/1999 |

OTHER PUBLICATIONS

EPODOC Abstract & CN 1140758.

Database WPI XP002119502 & JP 010033 B (Morinaga Milk Inds Co Ltd.).

* cited by examiner

BEVERAGE

This application is a continuation-in-part of U.S. application Ser. No. 09/700,512 filed Jan. 12, 2001, now U.S. Pat. Ser. No. 7,244,458, which is a National Stage of International Application No. PCT/GB99/01551, filed May 14, 1999, which claims priority to United Kingdom Application Ser. Nos.: 9810309.6, filed May 15, 1998; 9828321.1, filed Dec. 23, 1998; 9828317.9, filed Dec. 23, 1998; and 9901018.3, filed Jan. 19, 1999; all of which are incorporated by reference in their entireties herein.

BACKGROUND OF INVENTION

This invention relates to a beverage, to methods of presenting or serving a beverage, to providing a visual display in a beverage, and to apparatus to supply draught beverage.

The beverage concerned comprises a water content and a dissolved gas content.

The beverage may be an alcoholic beverage or a non-alcoholic beverage. For example, the beverage may be a beer, a cider, a flavoured alcoholic beverage, for example an alcoholic lemonade or other alco-pop style of drink, or a so-called low alcoholic drink. The term "beer" embraces lager, ale, porter and stout and includes a beverage comprising hops flavouring, an alcohol content derived from malt and fermentation, a water content, and a dissolved gas content.

One object is to provide a cool beverage using ice therein in a way which a consumer may find more agreeable because dilution of the drink cannot occur.

Another object to provide a beverage which the existence of cooling ice therein may be sustained whereby the drink may be kept cold for an extended period of time.

Another object is to provide a beverage in which a head thereon may be sustained (if the beverage has a head).

Another object is to provide a beverage in which ice may develop therein as an interesting visual display.

According to a first aspect of the invention there is provided a beverage in an open-topped vessel, said beverage comprising a water content and a dissolved gas content, and in said vessel the beverage having a head of foam over ice, said ice being formed in the beverage from water of said water content.

The vessel may be any suitable vessel, for example a drinking vessel, for example a glass.

Preferably there is a layer of ice adjacent the head, in contact with the head. Preferably there is a projection of ice extending downwards, away from the head, and being provided in the region of the head. The projection of the ice may depend directly from the head, or from a layer of ice beneath the head.

The ice is preferably made of many small crystals of ice, rather than a single solid mass. The ice is preferably slushy in character, rather than being a solid mass. There may be more than one kind of ice formation in the beverage. There may be a fine, powdery ice. There may be a flaky ice, of the order of 1 or 2 mm or 3 mm or 4 mm, or more, in their longest dimension of the flakes.

The beverage, which may be coloured as distinct from white or water clear, may have bands, or stripes, across it at different heights, the bands possibly being white layers where nucleation is taking place, and beverage-coloured layers interposed between the white layers where less nucleation is taking place. This effect may be achieved by using ultrasound on the vessel, for example a glass, of beverage. The white bands and the interposed beverage-coloured bands may be of substantially the same thickness.

The white bands interspersed by beverage-coloured bands may exist for a matter of seconds, rather than minutes, and typically exist for 1 to 10 seconds, preferably about 3 to 6 seconds. The white bands/beverage-coloured bands interspersed may exist for substantially the same time as ultrasound is applied to the vessel of beverage.

Nucleation means may be provided to encourage the formation of the ice crystals and/or head in the beverage when it is in a vessel. The nucleation means is preferably the administration of ultrasound, preferably to the bottom portion of a vessel of beverage, but it could be other forms of nucleation inducement. For example the vessel and/or dispense tap/nozzle (or an object to be inserted into the vessel of beverage) may have a roughened surface/high surface area surface to encourage nucleation (such as a sintered surface, etched surface, or a surface of ground material, such as glass); or a rapid and suitably large pressure drop may be provided to induce nucleation; or mechanical agitation may be provided; or the beverage may be arranged to have turbulent flow to promote nucleation; or an amount of liquid, possibly highly supersaturated with gas, may be introduced or injected; or gas may be otherwise introduced, or injected, or the glass may be vibrated in some way (e.g. by being exposed to sound waves, or the vessel may be vibrated in some other way); or by introducing a chemical (e.g. tablet) or device which generates bubbles (for example a chemical pellet may effervesce or dissolve, releasing bubbles).

According to a second aspect of the invention there is provided a method of keeping a beverage in an open-topped vessel cool, said beverage comprising a water content and a dissolved gas content, and said method comprising forming ice in the beverage in the open-topped vessel having a cooling effect on the beverage, said ice being formed in the beverage from water of said water content.

According to a third aspect of the invention there is provided a method of sustaining cooling ice in a beverage in an open-topped vessel, said beverage comprising a water content and a dissolved gas content, and wherein said ice is formed in the beverage from water of said water content, said method comprising providing a head of foam on the beverage such that in the vessel said ice is covered by the head which acts as head insulation above the ice against heat directed towards the ice from above the head.

According to a fourth aspect of the invention there is provided a method of sustaining a head on beverage in an open-topped vessel, said beverage comprising a water content and a dissolved gas content, said method comprising providing a head on the beverage and forming ice in the beverage from water of said water content, and in said vessel said ice having a cooling effect on the head from below an upper part of the head.

According to a fifth aspect of the invention, there is provided an open-topped vessel of a beverage the beverage comprising a water content and a dissolved gas content and being able to form a head as the beverage is dispensed into the vessel, the vessel of beverage having a head overlying an ice formation made of many ice crystals, the ice formation having been produced by ice forming in the beverage as it was dispensed or after it was dispensed into the vessel.

Preferably the vessel has a transparent or translucent wall or at least has a window of transparent or translucent material.

Preferably the ice formation extends substantially the width of the mouth of the vessel, or completely across the width of the mouth. It may comprise substantially homogenous ice-crystals in a head-contacting region or layer. Alternatively, the ice crystals that contact the head may not be substantially homogeneous.

The ice formation may have a projection extending away from the head. The projection may comprise flakes of ice that are larger than the ice at the ice-head boundary.

The ice at the ice-head interface may have been formed before the ice flakes of the projection.

The beverage may have been subjected to ultrasound signals and may be draught beverage delivered into the vessel. Before the draft beverage is delivered into the vessel, and preferably immediately before, the beverage may be cooled to a temperature below the freezing point of water at ambient atmospheric pressure.

According to a sixth aspect of the invention there is provided a method of serving draught beverage in an open-topped vessel, said beverage comprising a water content and a dissolved gas content, and said method comprising cooling the beverage to a temperature below the freezing point of water at ambient atmospheric pressure, and delivering the cooled beverage into said vessel, said cooled beverage being subjected to the effect of ultrasound signals or to the effect of other ice and/or gas bubble nucleation means.

The ultrasound signals may be applied externally of said vessel, and/or the ultrasound signals may be applied internally of said vessel to the cooled beverage. In the latter case an ultra-sonic emitter provided as or incorporated into a probe may be disposed in the beverage in the vessel. If desired a dispense outlet or nozzle from which the beverage is delivered into the vessel may be adapted to act as an ultra-sonic emitter to provide aforesaid ultrasound signals to said beverage in the vessel. Such signals may be applied to the beverage as it passes through the dispense outlet, and/or to the beverage in the vessel.

Ultrasound signals can be applied to beverage not only after it has been delivered into the vessel, but also or alternatively whilst it is being delivered. For example ultrasound may be applied to a stream of beverage during and/or after it has issued from a dispense or outlet nozzle.

The ultrasound signals may have a frequency in the range of 20 kHz to 70 kHz. For example, the ultrasound signals may have a frequency of substantially 30 kHz.

A mass of aforesaid ice may develop downwards in the beverage below the head.

Preferably, the vessel is chilled before the beverage is delivered thereinto. The vessel may be chilled to a temperature of substantially 4° C., or the vessel may be chilled to a temperature less than 4° C. For example, the vessel may be chilled to a temperature of substantially 0° C.

Prior to the delivery, and preferably just prior to the delivery, a draught beverage may be cooled to a temperature in a range of between substantially −1° C. and substantially −12° C. and may issue at a temperature substantially in that range into the vessel. If desired, the beverage may be cooled to a temperature between substantially −4° C. and substantially −6° C. The greater the alcohol strength by volume (abv), the lower the temperature to which the alcoholic beverage may be cooled. We may aim to achieve a dispense temperature of about −5° C. for a lager (or other drink) with about 4.5% abv (or to substantially −4° C. or substantially −6° C.).

Preferably, the vessel has a wall portion of sufficient transparency to allow the contents of the vessel to be visible through said wall portion. Thus the vessel may be a glass drinking vessel.

Preferably the beverage is a pale colour for example the colour of a pale beer. If desired the beverage can be a lager, or a cider.

Aforesaid dissolved gas may comprise carbon dioxide and/or may comprise nitrogen. A dissolved nitrogen content in the beverage, for example an alcoholic beverage may be in the range of substantially zero parts per million (p.p.m) to substantially 100 p.p.m. For some beverages, for example certain lagers, substantially 40 p.p.m. A dissolved carbon dioxide content may approach zero % by volume or be greater. Said carbon dioxide may be substantially at any of the following levels or in a range defined between any of the following levels; zero vols/vol, 0.5 vols/vol, 1 vols/vol, 1.4 or 1.5 vols/vol, 2.0 vols/vol, 2.2 or 2.4 vols/vol, 3 vols/vol, 4 vols/vols or 5 vols/vol or above.

If desired, the ultrasound signals can be accompanied by a mechanically or electrically produced audible performance and/or a visible light display. The audible performance may be tuneful or musical sound. The visible light displays may comprise visible flashes of light.

If desired the beverage can be subjected to the ultrasound within an enclosure arranged to conceal the vessel from view from at least one side of said enclosure.

According to a seventh aspect of the invention, there is provided a beverage comprising a water content and a dissolved gas content, wherein prior to being drunk said beverage is cooled to a temperature below the freezing point of water at ambient atmospheric pressure and delivered in a vessel to be drunk exposed to ambient atmospheric pressure, and wherein in said vessel aforesaid gas bubbles out of the beverage and at least a portion of said water content becomes ice.

According to an eighth aspect of the invention, there is provided a beverage to be available on draught and comprising a water content and a dissolved gas content, wherein prior to being drunk the draught beverage is to issue, at a temperature below the freezing point of water at ambient atmospheric pressure, from an outlet into a vessel open to ambient atmospheric pressure so that aforesaid gas bubbles out of the beverage and at least a portion of said water content becomes ice.

If desired, the vessel which preferably may be a drinking vessel, can have a shape or formation to promote formation of the ice. For example, the vessel may have an internal surface to provide nucleation sites to promote formation of the ice. Said surface may have at least a surface portion which is roughened. At least a wall portion of vessel can be arranged to change colour automatically with variation in temperature. Said wall portion may comprise thermo-chromic material.

Desirably, the gas is a non-oxidising gas. This can avoid or at least slow deterioration of the beverage. The gas comprises carbon dioxide and/or nitrogen. By cooling the beverage and forming ice therein, this appears to, initially at least, reduce the rate of release of dissolved gas from the beverage, for example lager, and appears to improve the drinking sensation, taste, flavour or bite. We believe that this is a combination of the low drinking temperature (maintained by the ice) and the greater amount of retained gas in the beverage.

The presence of the ice can provide an interesting and attractive feature which can be particularly fascinating as the ice may expand at a noticeable rate throughout the beverage after the vessel is filled. To add to the interest, the ice may include therein one or more streaks or regions of one or more colours which contrast(s) with the colour of the ice and/or beverage.

The aforesaid ice may be, or may have, the character of slush.

According to a ninth aspect of the invention, there is provided a method of serving a draught beverage which comprises a water content and a dissolved gas content, said method comprising issuing the draught beverage from an outlet into a vessel, prior to said issuing, storing or handling the beverage in a manner which impedes loss of the aforesaid dissolved gas from the beverage and cooling said beverage to a temperature below the freezing point of water at said ambient atmospheric pressure, and in said vessel aforesaid gas bubbles out of the beverage and at least a portion of said water becomes ice.

According to a tenth aspect of the invention, there is provided a method of providing a visual display or effect within a vessel having at least a portion of wall of some transparency, said method comprising providing a draught beverage comprising a water content and a dissolved gas content, issuing the draught beverage from an outlet into a said vessel, prior to said issuing, storing or handling the beverage in a manner which impedes loss of aforesaid dissolved gas from the beverage and cooling said beverage to a temperature below the freezing point of water at said ambient atmospheric pressure and a visual display or effect developing in the beverage in the vessel, said visual display or effect comprising aforesaid gas bubbling out of the beverage and formation of ice due to at least a portion of said water becomes ice.

Formation of ice can develop in the vessel so as to increase the amount and extent of the ice from substantially an upper level of the beverage downwards through the beverage.

At least a wall portion of the vessel may change colour automatically with variation in temperature. Said wall portion may comprise thermo-chromic material.

An implement can be inserted into the beverage in the vessel to encourage formation of said ice. For example, the implement may be a thermometer, or it may be a swizzle-stick.

Colouring material or dye can be provided to form at least one coloured streak or region in the beverage and/or ice, the colour of said material or dye being in contrast to that of the ice and/or beverage so as to be visible.

The aforesaid implement may be used to add the colouring material or dye to the beverage and/or ice.

In one method, the beverage may issue at substantially −4° C. into the vessel and thereafter the temperature of the beverage in the vessel may rise almost immediately to at least substantially −3° C.

According to an eleventh aspect of the invention, there is provided a beverage dispense apparatus comprising cooling means adapted to cool a beverage to below 0°C., a dispense tap, and beverage dispense pipework adapted to convey the beverage to the dispense tap, the arrangement being such that the apparatus is adapted to dispense the beverage cooled to below the point at which ice would normally form in the beverage if the beverage were left standing at atmospheric pressure and if nucleation means were provided for the standing beverage, and in which the undispensed beverage in the apparatus does not freeze solid.

Preferably, the apparatus includes pump means and the beverage dispense pipework may include a portion which circulates beverage past the dispense tap when the dispense tap is closed, the fact that cooled undispensed beverage is kept flowing tends to prevent the formation of ice blockages at the dispense tap.

The beverage may be kept flowing past the dispense tap (or through it when it is open) at substantially all times that the beverage is at a temperature at which ice may otherwise form at the dispense tap or, in the beverage dispense pipework.

Preferably, there is a cold circulation loop in which is provided at least one cooling means and which connected to the dispense tap, beverage in the circulation loop being kept cold by the cooling means and being kept circulating by pump means provided in the circulation loop. There may be a plurality of cooling means (e.g. heat exchangers) in the circulation loop. There may be a plurality of dispense taps associated with the circulation loop.

Beverage upstream of the circulation loop may be cooled to a temperature about that at which ice may form in the beverage under the conditions of temperature and pressure experienced by the beverage in the pipework upstream of the circulation loop.

According to a twelfth aspect of the invention, there is provided apparatus to supply draught beverage, comprising beverage heat exchange means, a beverage outlet for cold beverage from said heat exchange means to issue from the outlet, openable and closable valve means to control supply of beverage to said outlet, and a beverage circulation loop for beverage to circulate in said loop.

The beverage can circulate in the loop when the valve means is closed. Preferably, the loop comprises pump means to circulate said beverage.

A purpose of circulating the beverage is to reduce the risk of or avoid freezing beverage blocking a beverage supply path to the outlet. Said loop may include a beverage flow passage in said heat exchange means.

In a preferred embodiment, the apparatus can comprise a unit or dispenser mountable on a counter of a drinks' bar and comprising the heat exchange means and the outlet.

A beverage flow path can connect a reservoir of the draught beverage to the heat exchange means. The flow path may comprise at least a portion of the loop.

The flow path may divide into a plurality of beverage routes, and the loop may comprise one or more of the routes.

Intermediate the reservoir and the first-mentioned heat exchange means. The beverage may be subject to the effect of second beverage cooling heat exchange means.

The reservoir may be subjected to cooling.

If desired, the second heat exchange means may act on at least a portion of the loop.

Coolant common to the first and second heat exchange means may circulate therethrough.

Beverage cooling heat exchange means may act on the beverage intermediate said reservoir and loop.

One advantage of a specific embodiment of the invention is that it enables us to provide cool beverage using ice therein in a way which a consumer may find more agreeable because dilution of the drink cannot occur. Another advantage may be that we can provide a beverage in which the existence of cooling ice therein may be sustained whereby the drink may be kept cold for an extended period of time.

A further advantage may be that we can provide beverage in which a head thereon may be sustained for a longer period of time than is achieved by the same beer dispensed at, say 6° C., or at say 4° C. using similar or the same dispense apparatus. Yet a further advantage of one embodiment of the invention is that it enables us to provide beer in which ice may develop therein as an interesting visual display.

It is extremely difficult to serve a glass of draught cider with a head of froth or foam so that the head lasts for any appreciable time. Though it is possible to create a head by dispensing the cider from a font containing a sparkler, the head quickly disappears. Because the use of a sparkler slows the delivery rate of the cider, it takes longer to deliver a measured volume than if the sparkler were not used, and because the head quickly vanishes anyway some people think use of a sparkler pointless and take if off the font—sometimes without permission.

Another object is to provide a method of serving draught cider containing a dissolved gas content so that a head on the delivered draught cider in a vessel, for example a drinking glass, is more stable and remains for a longer period of time than a head on cider served by hitherto known methods.

According to a thirteenth aspect of the invention, there is provided a method of serving draught cider in an open-topped vessel and wherein said cider comprises a water content and a dissolved gas content, said method comprising cooling the cider to a temperature below the freezing point of water at ambient atmospheric pressure, and delivering the cooled cider into said vessel, said cooled cider being subjected to the effect of ultra-sound signals.

The cider may be cooled to a temperature in the range of substantially on −1° C. to substantially −12° C. For example, the cider may be cooled to substantially −6° C. The greater the alcohol strength by volume the lower the temperature to which the cider may be cooled.

If desired, the cooled cider may issue from a dispense outlet through a sparkler. However, the cooled cider may pass through an orifice plate in a dispense outlet from which the cider issues.

Preferably the open-topped vessel is chilled before receiving the cider. The vessel may be chilled to substantially 4° C. or may be chilled to a temperature lower than 4° C. For example, the vessel may be chilled to substantially 0°C.

Said ultra-sound signals may have a frequency in the range of substantially 20 kHz to substantially 70 kHz. For example, the ultra-sound signals may have a frequency of substantially 30 kHz.

The ultra-sound signals can be applied externally of said vessel to said vessel.

The ultra-sound signals may be applied internally of said vessel to the cooled cider. Thus an ultra-sonic signal emitter may be disposed in the cider in the vessel for emitting ultra-sound signals into the cider in the vessel.

The dispense outlet from which the cooled cider issues into said vessel may be adapted to act as an ultra-sonic signal emitter to provide aforesaid ultra-sound signals. Aforesaid ultra-sound signals may be applied to aforesaid cider flowing through the dispense outlet.

The dissolved gas content may comprise carbon dioxide and/or nitrogen. The carbon dioxide may approach zero % by volume or be greater, and/or the nitrogen content may approach zero parts per million (p.p.m.) or be greater for example, the carbon dioxide content may be substantially 1.8% by volume and/or the nitrogen content may be substantially 18 parts per million (p.p.m.).

According to the fourteenth aspect of the invention there is provided cider in an open-topped vessel wherein said cider has a dissolved gas content and water content, and wherein said cider has a head of foam over ice, said ice being formed from water of said water content. In said cider according to said fourteenth aspect of the invention, said head and ice may be produced at least in part by performance of said method according to the thirteenth aspect.

According to a fifteenth aspect of the invention there is provided a method of sustaining a head on cider in an open-topped vessel wherein said cider comprises a water content and a dissolved gas content, said method comprising providing a head on the cider and forming ice in the cider from water of said water content, and in said vessel said ice forming a layer covered by said head. In said method according to the fifteenth aspect of the invention, said head and ice may be produced at least in part by performance of said method according to the thirteenth aspect.

According to a sixteenth aspect of the invention there is provided a method of serving a beverage in an open-topped vessel, comprising providing a beverage having a water content, cooling the beverage to a temperature below the freezing point of water at atmospheric pressure delivering the cooled beverage into the open-topped vessel, and promoting formation of nucleation sites in the beverage in the vessel at which sites ice forms in the beverage from aforesaid water content.

The beverage may comprise a dissolved gas content which bubbles out of the beverage in the vessel and creates aforesaid nucleation sites at aforesaid bubbles.

The beverage may be subjected to an effect of ultrasound to promote formation of nucleation sites.

The beverage may comprise solid matter acting as or promoting formation of aforesaid nucleation sites.

According to a seventeenth aspect of the invention there is provided an apparatus to supply a draught beverage, comprising beverage cooling heat exchange means, a beverage outlet for cold beverage from said heat exchange means to issue from the outlet, openable and closable valve means to control supply of beverage to said outlet and a beverage circulation loop for beverage to circulate in said loop, and said heat exchange means comprising a cooler or cold water both cooling said beverage.

The heat exchange means may comprise a heat exchanger which can cool the beverage and also heat the beverage circulating in the loop.

The heat exchanger may use the peltier effect so that a reversal of electrical current thereto can cause heating of the beverage.

The invention will now be further described by way of example with reference to the accompanying drawings in which.

Figure 1:
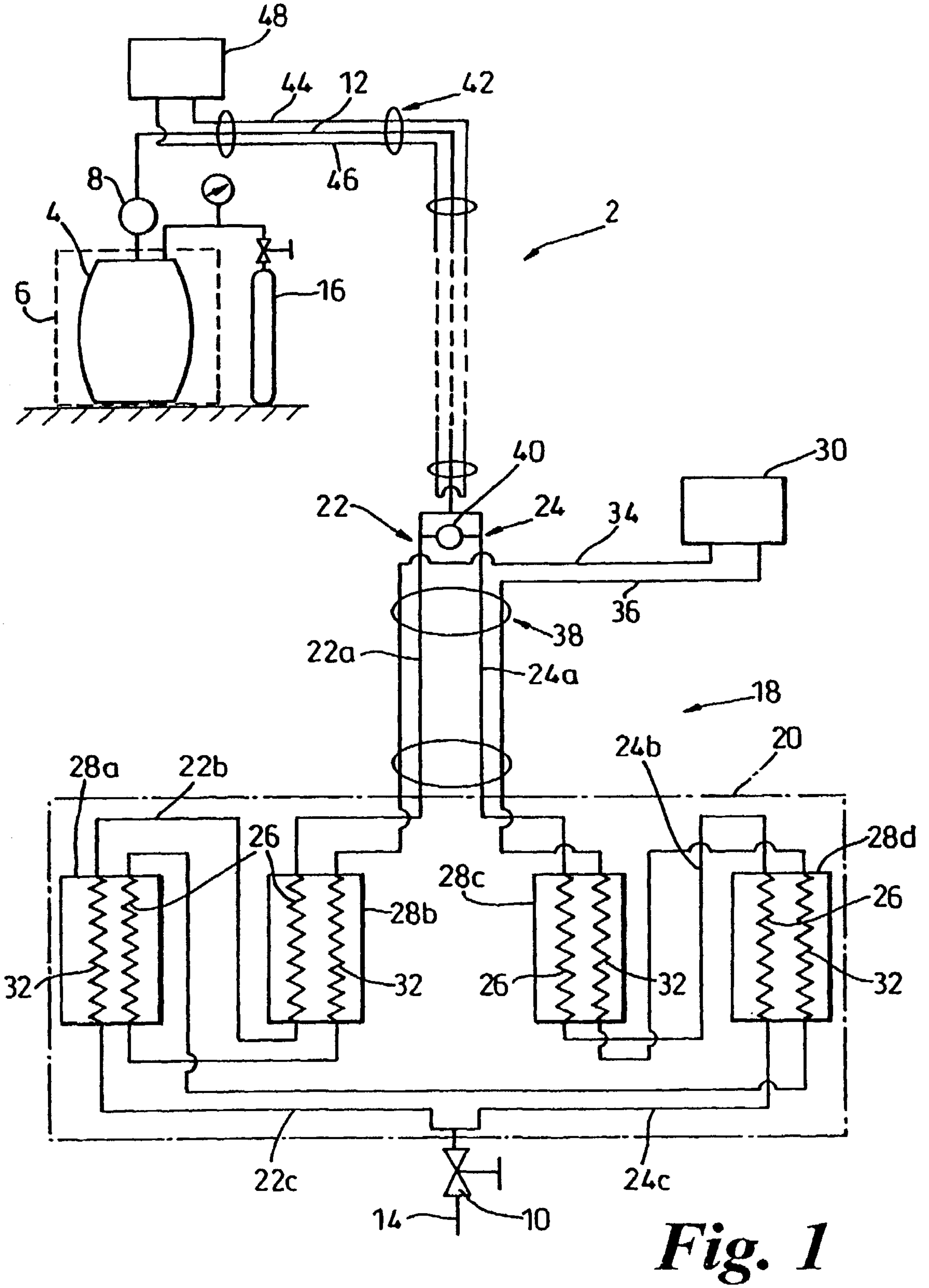
FIG. 1 is a diagrammatic view of apparatus for delivering cooled draught beverage.
Figure 5:
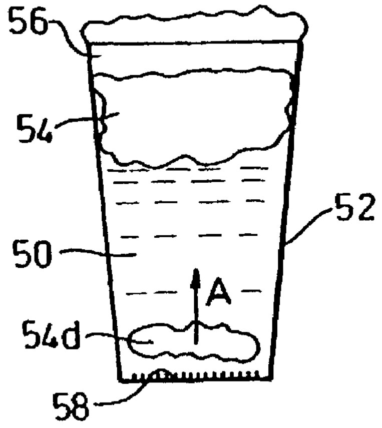
Figure 6:
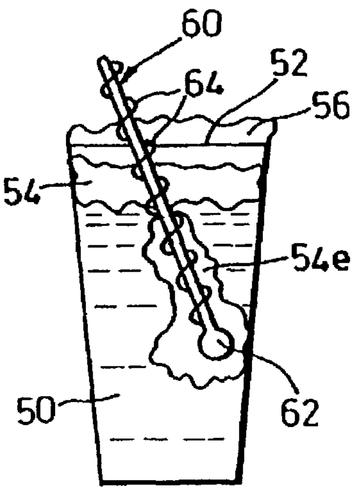
Figure 7:
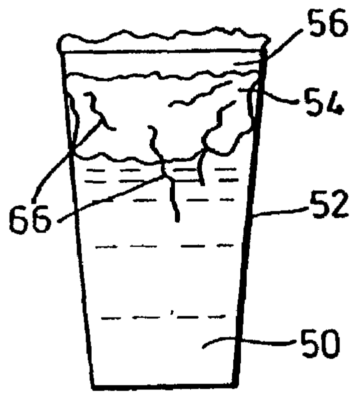
Figure 8:
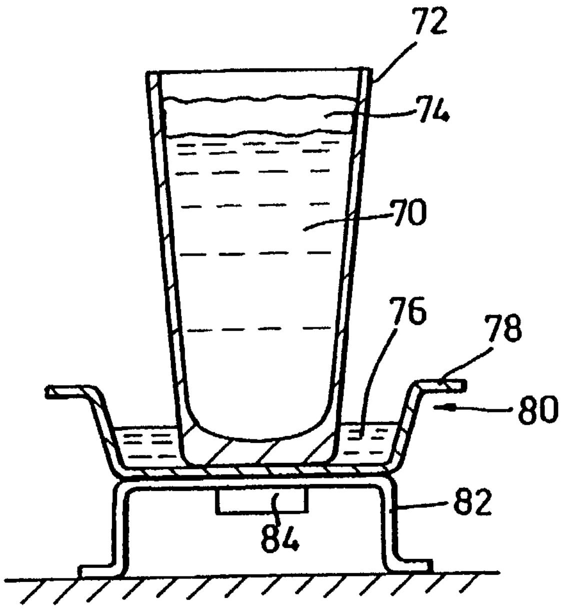
Figure 16:
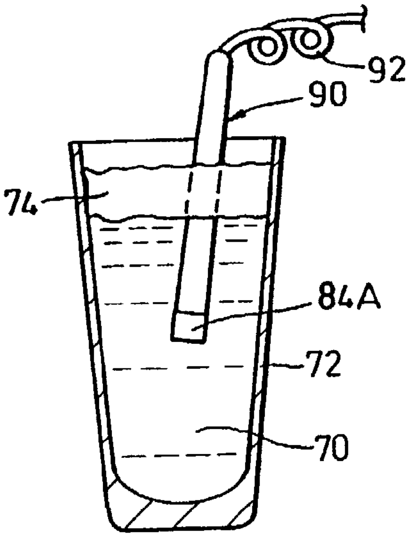
Figure 17:
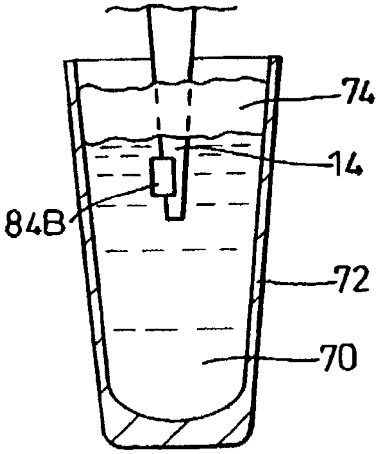
Figure 18:
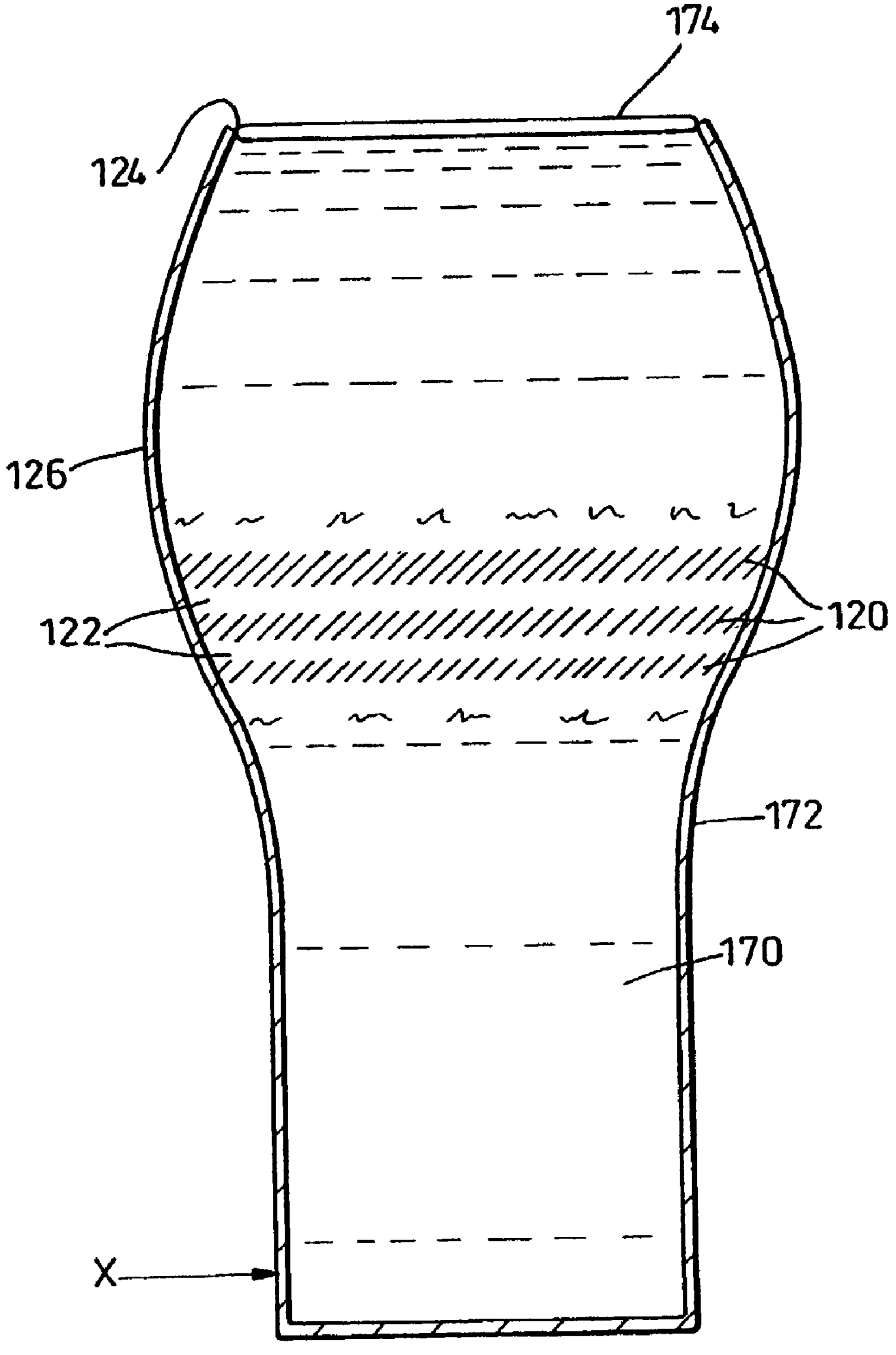
Figure 19:
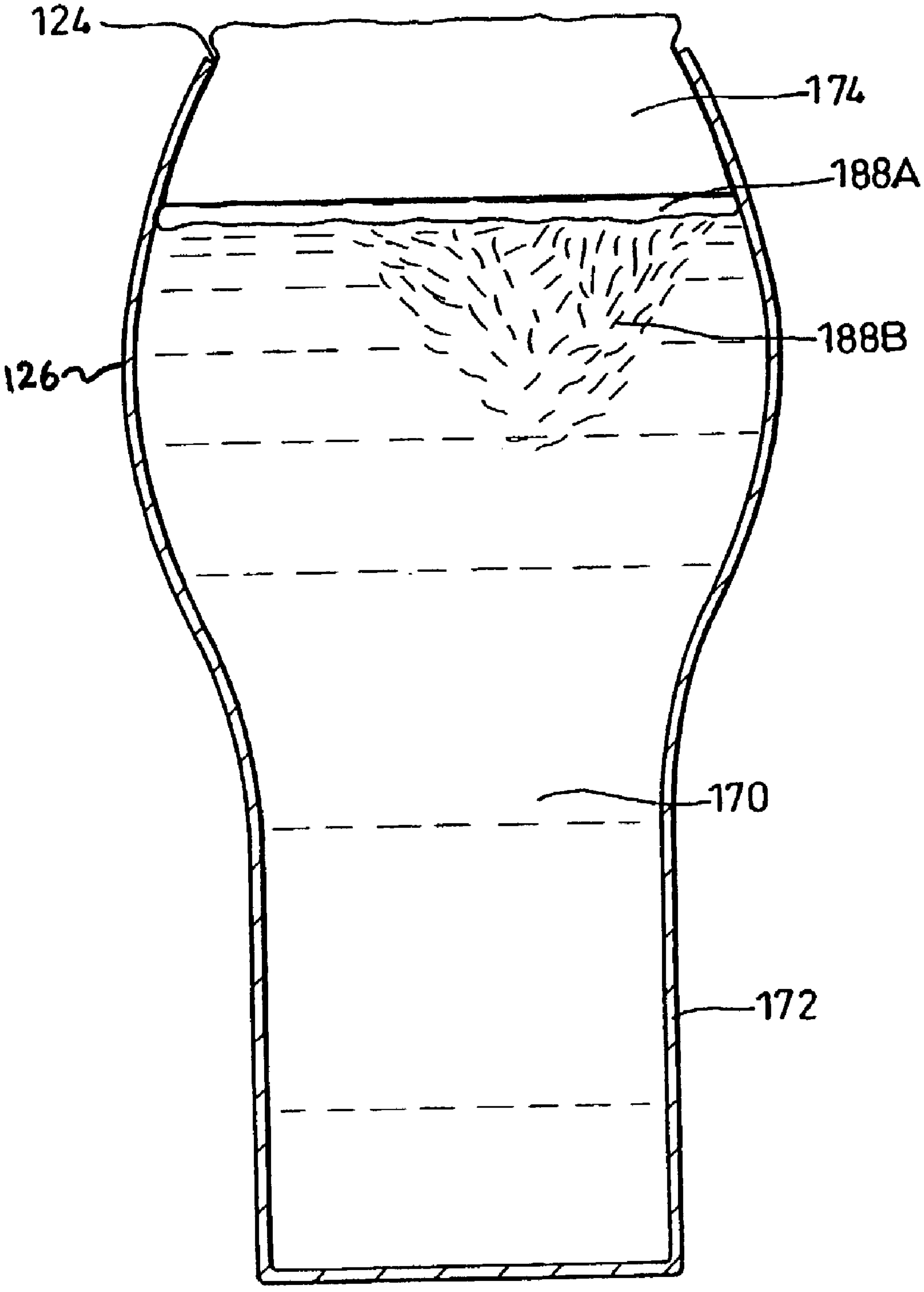
Figure 20:
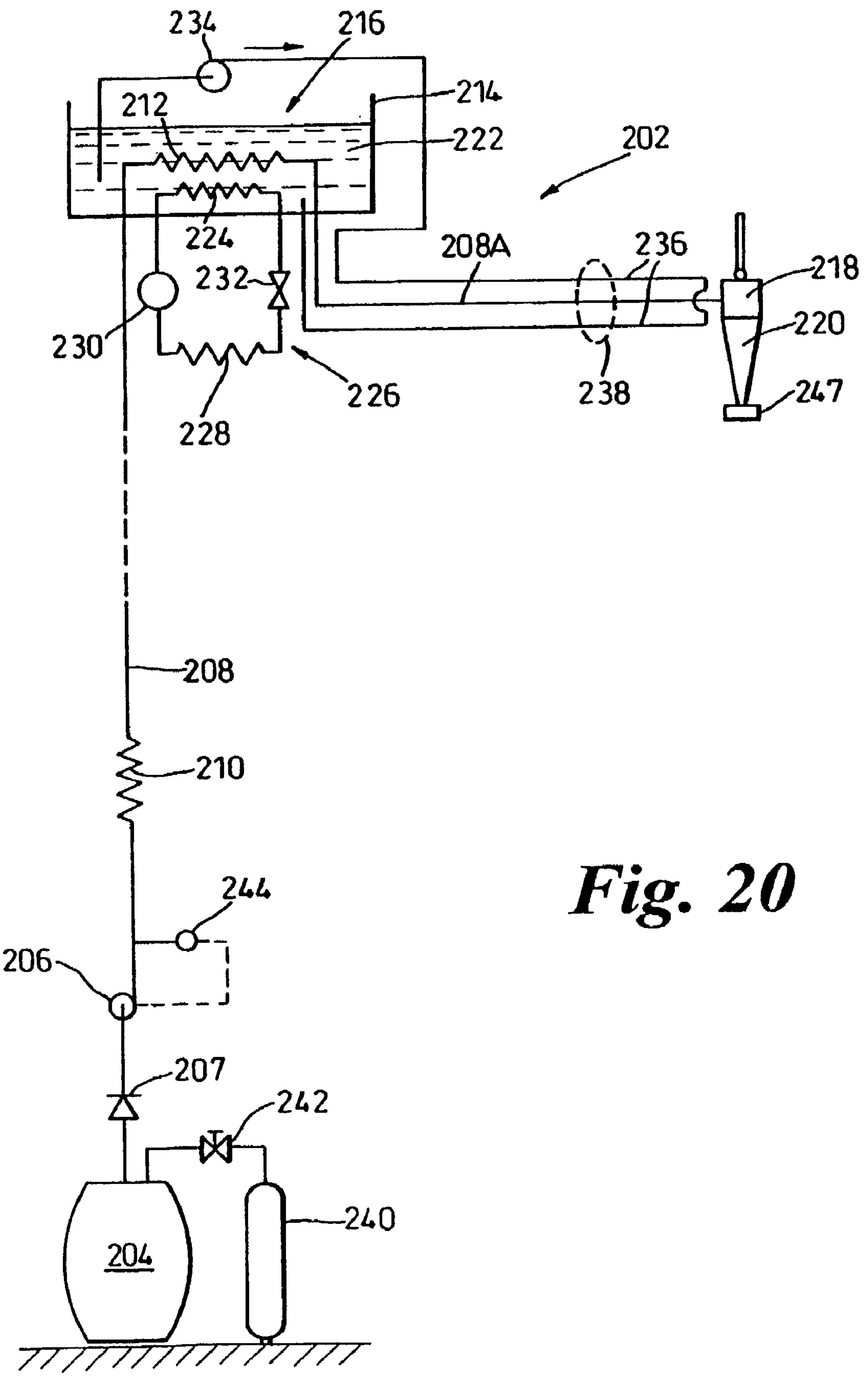
Figure 21:
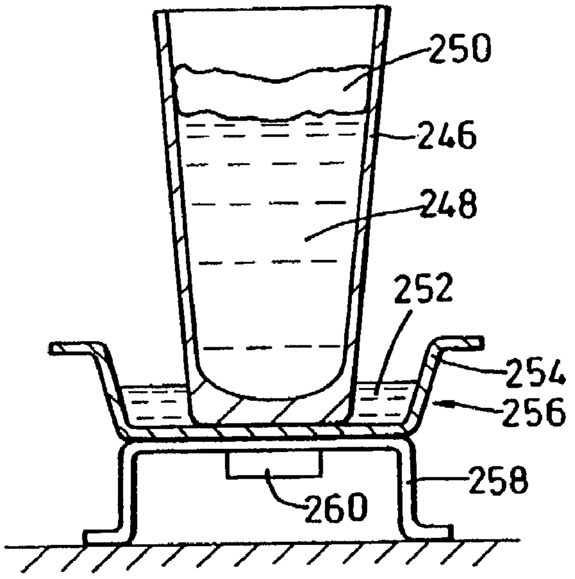
Figure 22:
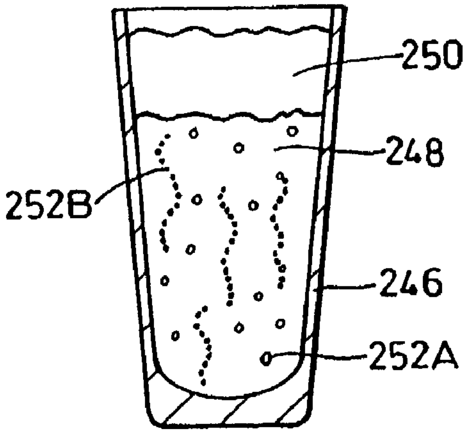
Figure 23:
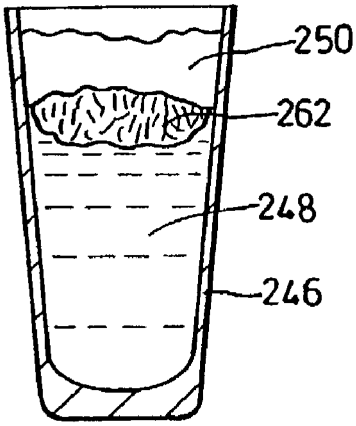
Figure 24:
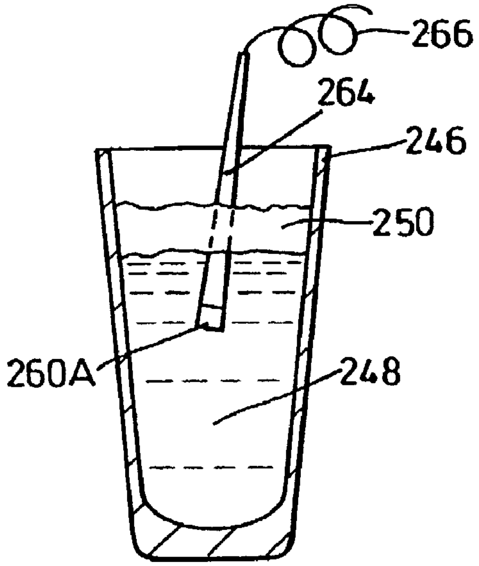
Figure 25:
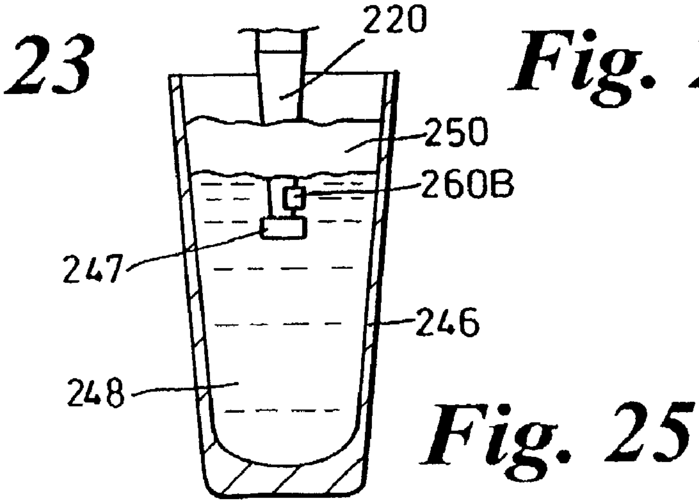
Figure 27:
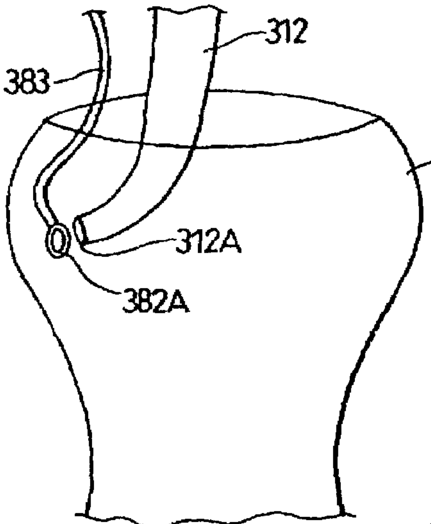
Figure 26:
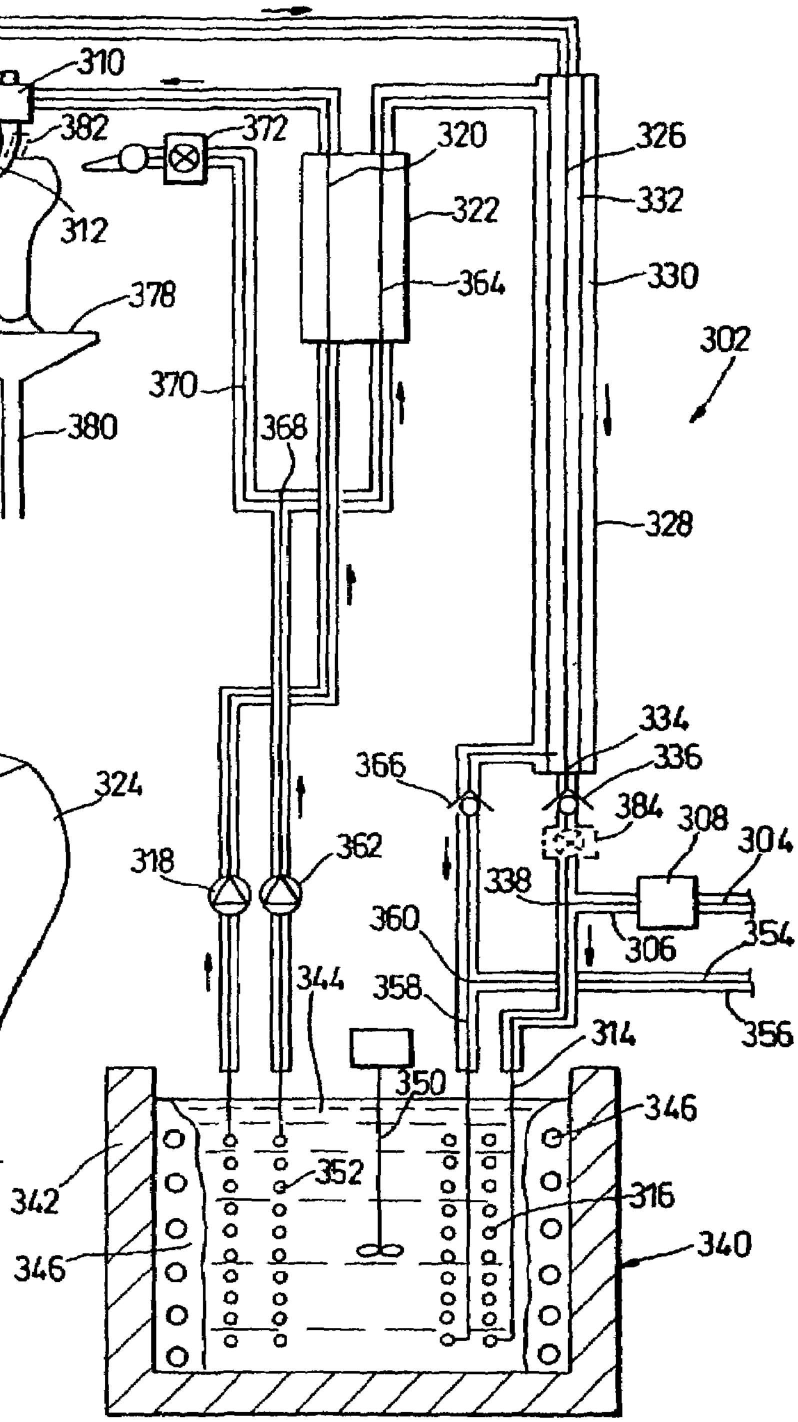
Figure 28:
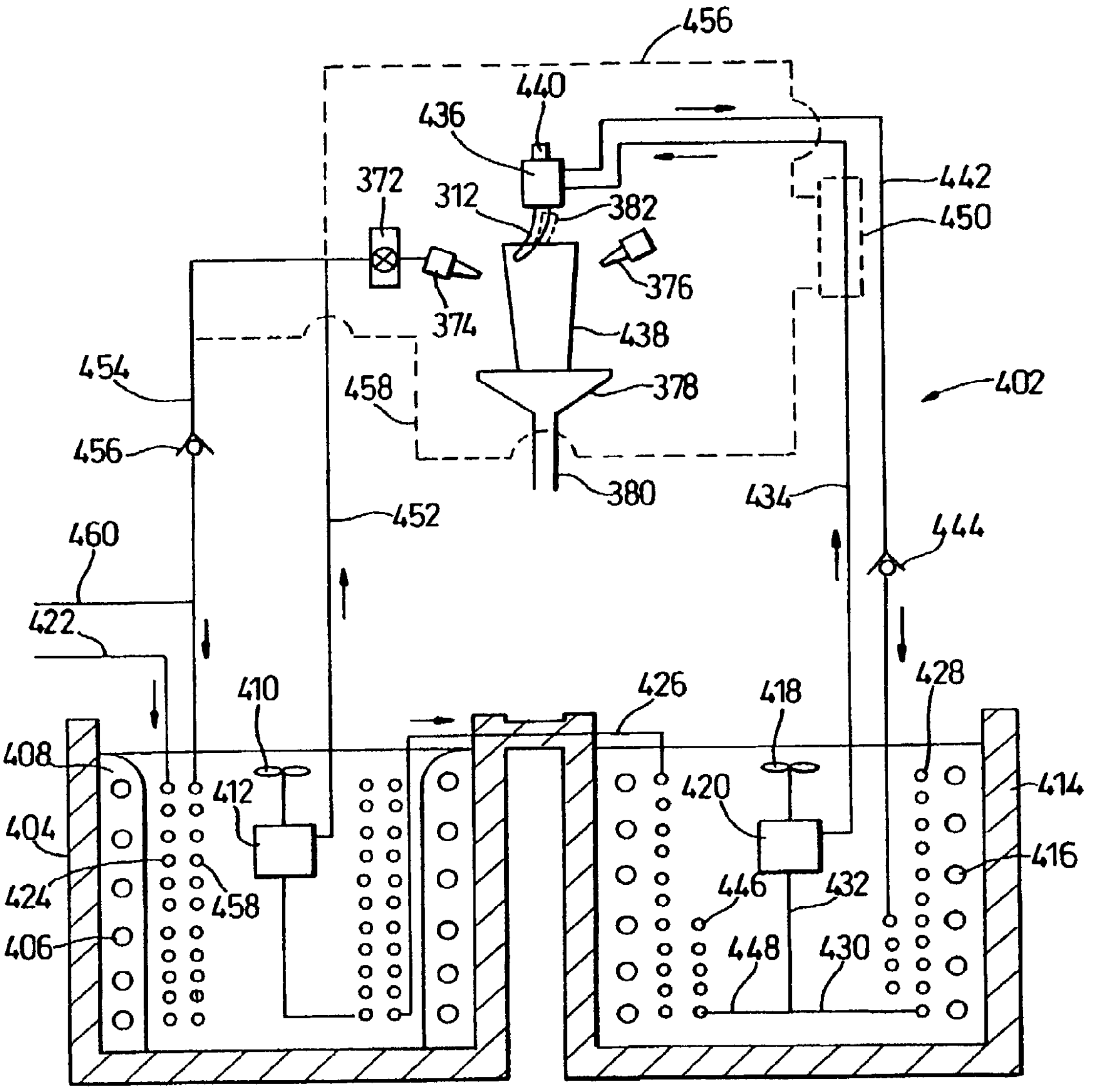
Figure 29:
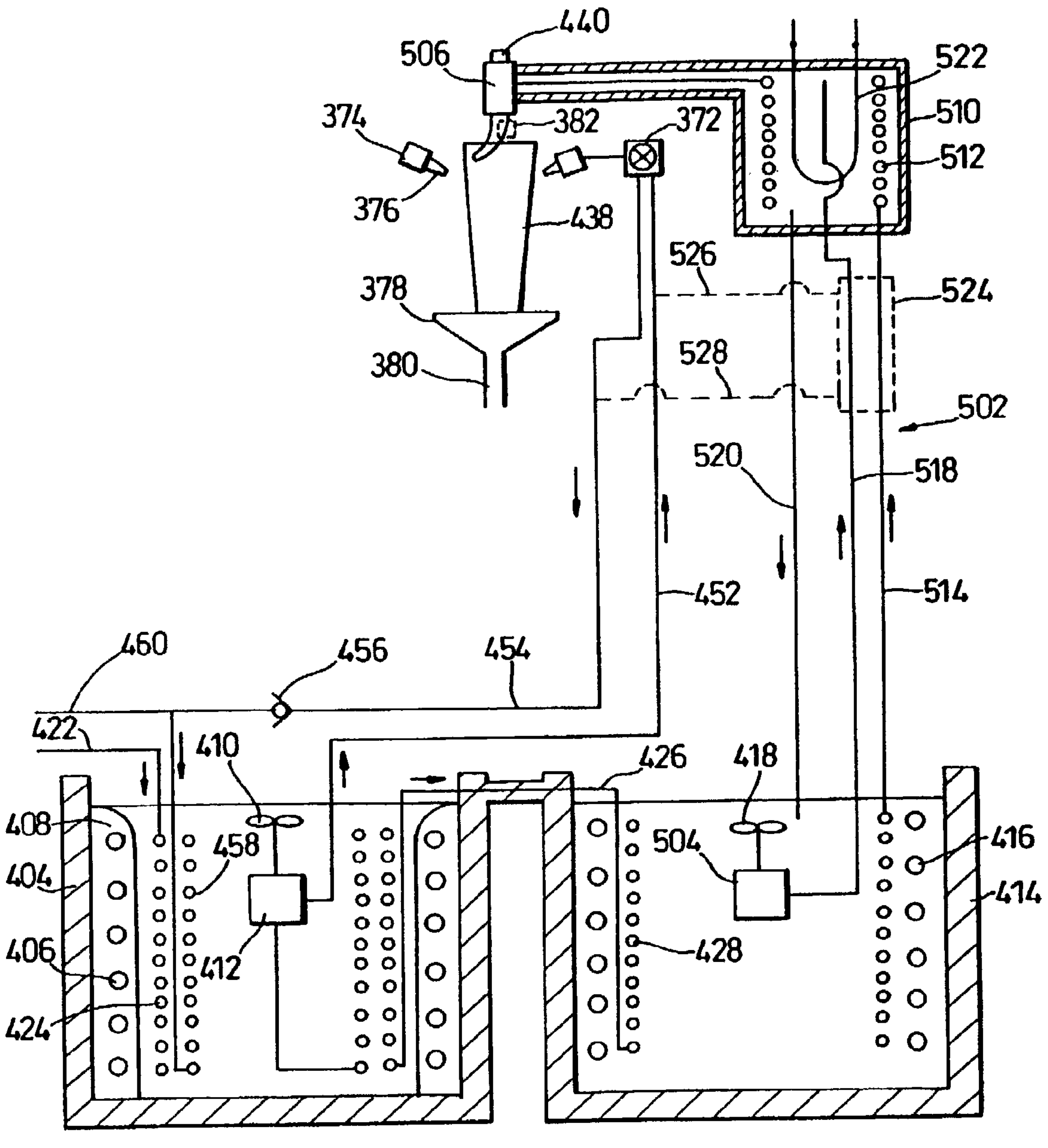
Figure 30:
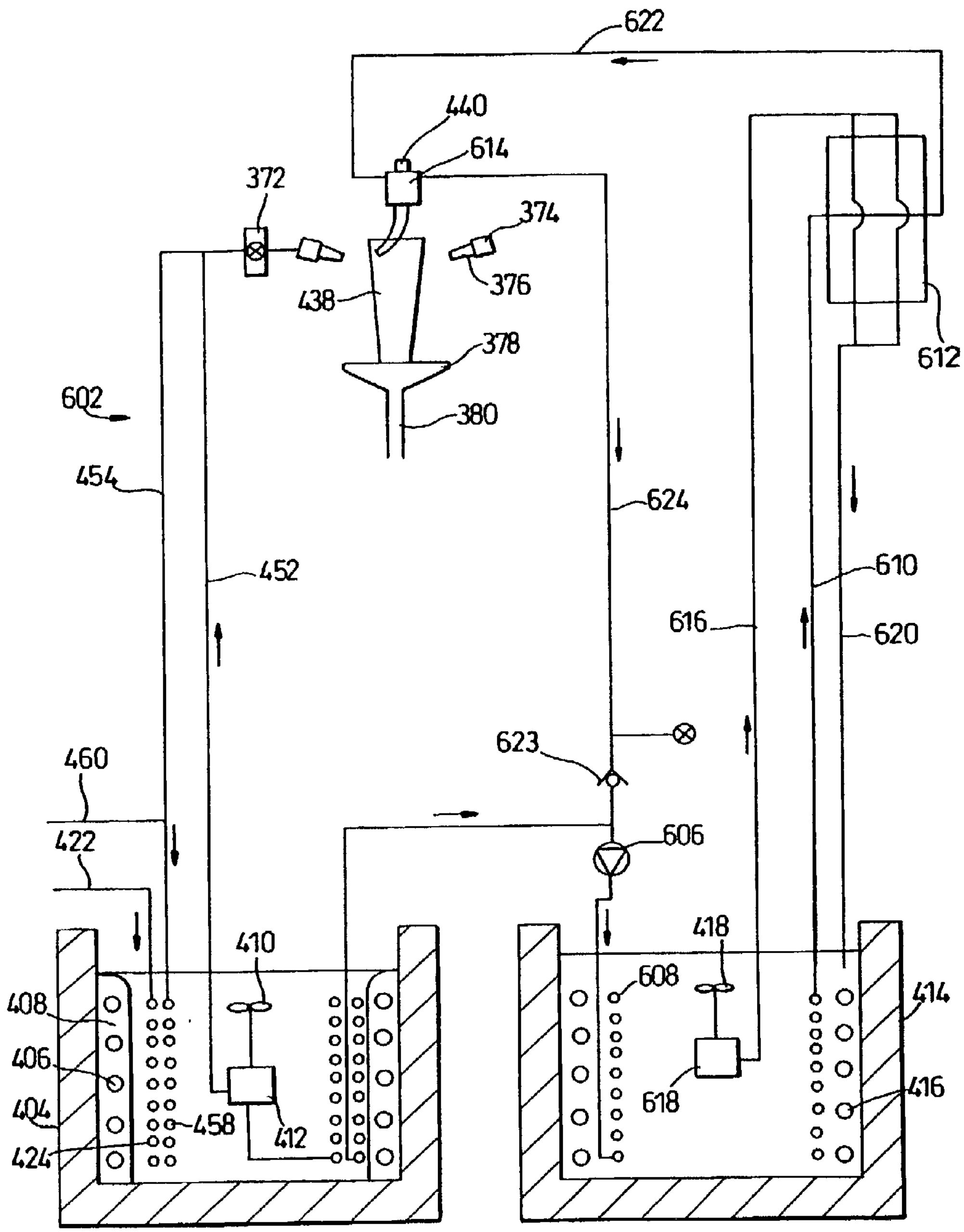

FIGS. 5 to 7 respectively shows diagrammatic side elevations illustrating modifications in the way the delivered beverage may be served in the drinking vessel;

FIG. 8 is a diagrammatic view showing in elevation a drinking vessel filled with a beverage delivered by the apparatus in FIG. 1, the vessel being shown standing on apparatus represented diagrammatically to apply ultrasound signals to the beverage;

FIGS. 9 to 15 shows diagrammatically in elevation successive changes in the development or variations in a head on the beverage subsequent to the beverage being subjected to ultrasound signals and also to development or variation in ice formed in the beverage;

FIG. 16 is a diagrammatic view of an alternative method of applying ultrasound signals to the beverage;

FIG. 17 is a diagrammatic view of yet a further method of applying ultrasound signals to the beverage;

FIG. 18 shows a pint of lager being excited by ultrasound;

FIG. 19 shows the pint of lager in FIG. 18 after it has been allowed to stand for three minutes;

FIG. 20 is a diagrammatic view of apparatus for delivering cooled draught cider;

FIG. 21 is a diagrammatic view showing in elevation a drinking vessel filled with cider delivered by the apparatus in FIG. 20, the vessel being shown standing on apparatus represented diagrammatically (and similar to that in FIG. 8) to apply ultra-sound signals to the cider;

FIGS. 22 and 23 shows diagrammatically in elevation successive changes in the development of the variations in the head on the cider subsequent to the cider being subjected to ultra-sound signals and also to development of or variations in ice formed in the cider;

FIG. 24 is a diagrammatic view of an alternative method of applying ultra-sound signals to the cider;

FIG. 25 is a diagrammatic view of yet a further method of applying ultra-sound signals to the cider;

FIG. 26 is a diagrammatic view of another embodiment of apparatus for delivering cooled draught beverage;

FIG. 27 is a fragment of a modification of the apparatus in FIG. 26;

FIGS. 28 to 30 are diagrammatic views of still further respective embodiments of apparatus for delivering cooled draught beverage.

With reference to FIG. 1, draught beverage is stored in a keg or cask 4 which may be made of metal. The cask 4 can be stored in a cold-room known per se in public houses or clubs and/or, if desired, in a more specific cold or cooled enclosure 6, for example a tank contained a chilled mixture of water and ethylene glycol. As stated above the beverage has a water content and a dissolved gas content. This gas may be any suitable non-oxidising gas, for example carbon dioxide and/or nitrogen. The amount of gas dissolved in the beverage may be within the usual known range for beverages, and the pressure within the cask 4 and the remainder of the supply apparatus (described below) may also be within the usual known range for beverages supplied on draught.

The beverage may be a beer which term includes lager, ale, porter, or stout, or may be cider. The dissolved carbon dioxide content may be greater than substantially 1 vols/vol or 2 vols/vol and may be substantially 2.2 volumes per volume, and/or the dissolved nitrogen content may be substantially 25 p.p.m. to 35 p.p.m. If desired the carbon dioxide content may be substantially 4 vols/vol or substantially 5 vols/vol. The alcohol content may be between 2.5% abv to 6 or 7% abv, preferably 4-5% abv, ±1% abv.

The beverage may be a flavoured alcoholic beverage.

A pump 8, arranged to operate substantially only when the manually operable valve 10 is open, is provided to pump beverage from the cask 4 along a pipe 12 ultimately to the valve 10 and a dispense outlet 14 therefrom. In known manner, a blanket or atmosphere of non-oxidising/pressurised gas (for example carbon dioxide and/or nitrogen) is provided in the cask 4 from a suitable supply 16 and assists the pump 8 in the extraction of the beverage.

A beverage dispense unit is indicated generally at 18 and has a cover indicated by interrupted lines 20. The dispense unit may be mounted at or in the vicinity of a drinks' bar—for example on the top of, or incorporated into, a counter of the bar.

In proximity to the cover 20 the pipe 12 divides into two flow paths 22 and 24, each leading to the valve 10. One is formed by piping 22*a*, 22*b*, 22*c* and passages 26 in heat exchangers 28*a* and 28*b*, and the other is formed by piping 24*a*, 24*b*, 24*c* and passages 26 in heat exchangers 28*c* and 28*d*.

A chiller unit 30 circulates coolant through passages 32 in the heat exchangers 28 in the series by a system comprising a coolant flow pipe 34 and a coolant return pipe 36. Beverage pipes 22*a* and 24*a* can be bundled together in known manner with the coolant pipes 34 and 36 to form a python 38. The heat exchangers 28 may be plate heat exchangers.

A circulation pump 40 which may operate continuously, extends between the flow paths 22 and 24 adjacent to the junction between the pipe 12 and the flow paths. Thus, the flow paths 22, 24 and the pump 40 form a circulation loop 22, 24, 40 around which beverage is continuously circulated when valve 10 is closed.

As suggested in FIG. 1, in the beverage dispense unit 18, the heat exchangers 28 are within the cover 20, whilst the valve 10 and outlet 14 can be on its exterior, and a portion of the circulation loop comprised by the pump 40 and sections of pipes 22*a* and 24*a* is also external of the cover and may be to ambient temperature at the bar.

If desired, the pipe 12 may be incorporated in know manner into another cooling python 42 comprising flow and return pipes 44 and 46, carrying coolant from and back to a chiller unit 48.

Overall, the beverage arrangement—and particularly that provided by the dispense unit 18 by the heat exchangers 28—so cools the beverage that the beverage issuing from the outlet 14 when valve 10 is opened at a temperature below the freezing point of water at the ambient atmospheric pressure. For example the beverage may issue at a temperature in the range of substantially −1° C. to substantially −12° C. into a drinking vessel or drinking glass. The range may be substantially −4° C. to substantially −6° C. A target temperature of −5° C. is aimed for if we use a beverage with about 4.5% abv.

When the valve 10 is closed, the beverage is circulated automatically around the loop 22, 24, 40 so it cannot stand still and start to freeze and block the supply path to valve 10.

In the case of draught beverages, for example beers, conventionally served with a head, the outlet 14 may include a known orifice plate, or other device, to promote foaming.

Figure 2:
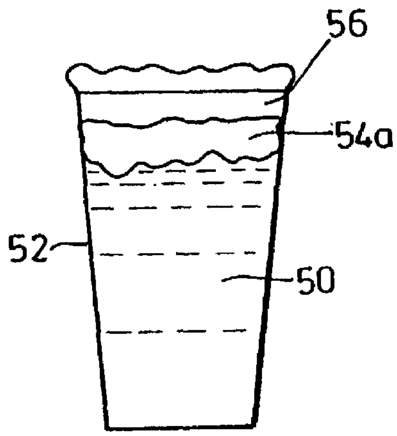
FIGS. 2 to 4 show diagrammatically in elevation a drinking vessel filled with draught beverage delivered by the apparatus in FIG. 1 to illustrate successive changes or variations in the beverage after delivery thereof into a drinking vessel.
Figure 3:
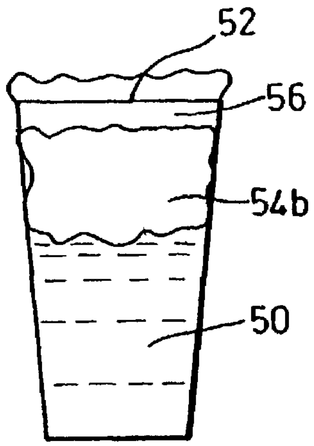
Figure 4:
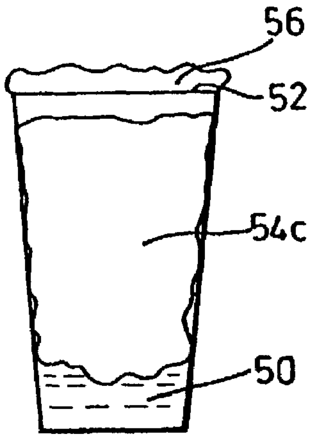

With reference to FIG. 2, when a draught beverage 50 is delivered from the outlet 14 (FIG. 1) into a drinking vessel 52 (for example a glass) the beverage is exposed to ambient atmospheric pressure and ambient or room temperature, the beverage temperature starts to increase, for example to −3° C. Almost immediately, a slug of ice 54*a* forms near the top of the vessel 50 at the upper level of the beverage, the ice being caused (we believe) as a result of nucleation sites resulting from the forming of bubbles of dissolved gas. If the beverage 50 has a head 56 of foam the ice forms just below the head. The or a greater part of the ice may be in the nature of slush and is formed from the water already forming the beverage. The slug of ice grows as indicated at 54*b* in FIG. 3 and 54*c* in FIG. 4 until it may substantially occupy the vessel 52. The growth of ice (in, say, a pint glass) can be accomplished in a minute or two, is fascinating to watch and can give rise to interesting visual effects based on the growth of the ice and the bubbling off of the gas. Another interesting visual effect is that cooled beverages delivered into a drinking vessel from the apparatus in FIG. 1 swirl in the vessel for a longer time period than beverages which have not been cooled.

Not only does the formation of the ice give rise to interesting visual effects, but the existence of the ice helps to keep the drink cool longer. Also, since the ice is formed from the water in the beverage, the beverage is not diluted by the ice. In fact, for an alcoholic beverage, the overall amount of alcohol remains the same in the container when the ice forms, but since water is being used for the ice, the alcoholic strength of the remaining liquid beverages increases until the ice melts.

The vessel 52 may be shaped or formed to encourage formation of the ice. In FIG. 5, a region 58 (having a rough surface) is provided to encourage formation of nucleation sites to promote formations of a further ice slug 54*d* which rises as indicated by arrow A to enlarge the ice slug 54 developing from the top of the vessel 52.

In FIG. 6, formation of further ice 54*e* in the body of the beverage 50 is encouraged by the insertion therein of an elongate implement or rod 60 represented in FIG. 6 by a swizzle-stick having formations 62 and 64 at its lower end and shank respectively which further encourage development of nucleation sites. In another instance, the rod 60 may be a thermometer body which can also be used to take the temperature of the drink to see if it has risen sufficiently high for it to be safe to drink. The implement can be used to push the ice around.

In FIG. 7, coloured regions or streaks are shown in the ice 54 and beverage 50. These coloured formations are formed by the release of non-toxic, edible, colouring materials or dyes into the beverage 56. The colouring material or dye, which stands out visually form the ice and beverage, may be injected into the beverage, or may be introduced into the beverage by or on the aforesaid implement.

It is preferable for the vessel 52 to have a wall of sufficient transparency so that the formation of the ice slug 54 in the beverage 50 can be observed and its changing nature visually appreciated.

The drinking vessel 52 can be formed of, or have external surface areas formed of, material (for example thermo-chromic material) which automatically changes colour with temperature change. Apart from this being a further interesting visual effect, the attainment of one particular colour may signal that the beverage is at a suitable temperature for drinking.

Whilst any kind of beverage having a water and dissolved gas content may be used, we believe that lager demonstrates a visual nature or character of the invention.

With reference to FIG. 8, a draught beverage 70 (which may be a beer, for example a lager) is delivered from the outlet 14 (FIG. 1) into a drinking vessel 72, for example a glass which is preferably rather tall and preferably has a clear or transparent wall.

Preferably, the vessel 72 is chilled before it received the beverage. The vessel 72 may be chilled to a temperature of substantially 4° C. or less. For example a known bottle chiller may be used to chill the vessel 72 to substantially 4° C. whilst a known glass froster may chill the vessel to substantially 0° C. A head of foam is shown at 74 and preferably this is some way below the top of the vessel 72 when the vessel contains a full measured volume, for example a pint of the beer.

Immediately after the cold beverage is poured into the chilled vessel 72 (or a few seconds after), the vessel is placed in a shallow depth of water 76 in a dish part 78 of an ultrasound generating apparatus 80 in which the dish 78 is securely mounted or affixed against a base part 82 containing an ultrasonic emitter 84. The emitter 84 may be arranged to emit ultrasound signals in a frequency range of substantially 20 kHz to 70 kHz. For example the beverage may be subject to ultrasound signals of a frequency of substantially 30 kHz or some other frequency selected from the aforesaid range, the water layer 76 providing an ultrasound for any desired period, though usually a short period of a few seconds, for example substantially one to five seconds and more specifically about three or four seconds. The user may be able to vary the length of time that the ultrasound is applied, for example by having to hold down a switch, or by altering the setting on a control.

Figure 9:
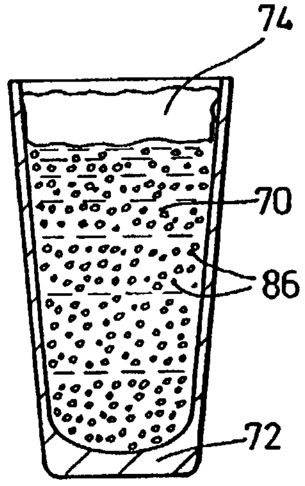
Figure 10:
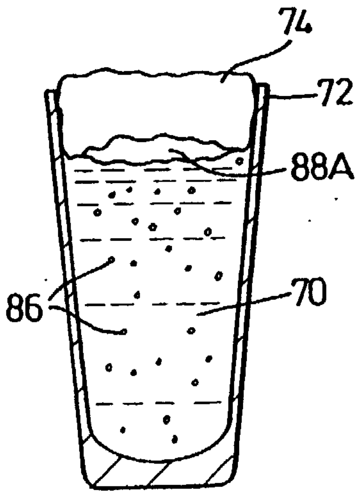
Figure 11:
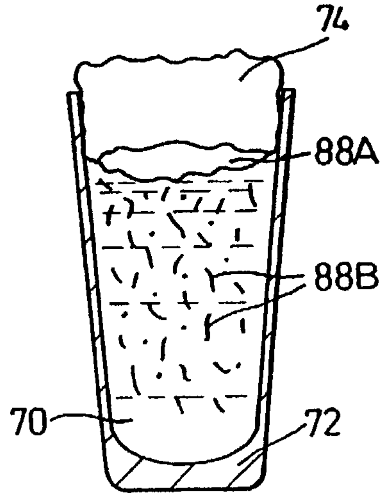
Figure 12:
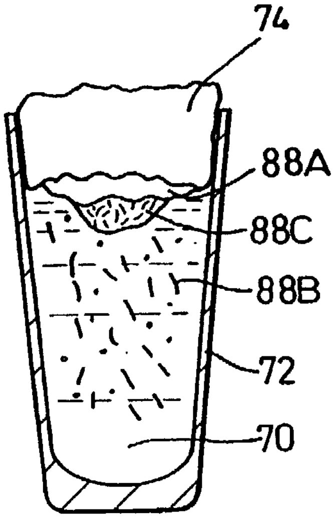
Figure 13:
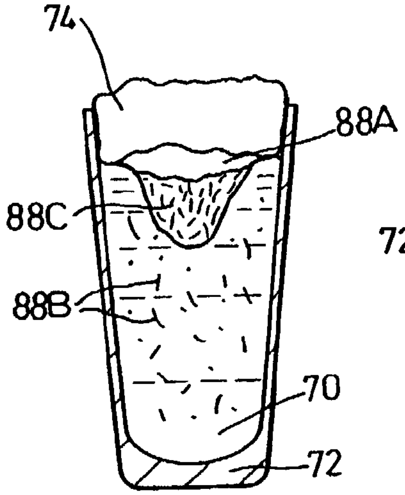

The result in a short time (perhaps a few seconds to the order of ten seconds) is shown in FIG. 9 in which the exposure to ultra-sonic signals has promoted a fairly dense sudden formation of a mass of bubbles 86 of the dissolved gas throughout the liquid beverage. This causes the head 74 to increase in height. As shown in FIG. 10, the head 74 may rise out of the vessel 72. The gas bubbles form nucleation sites encouraging the quick formation of a mass of ice 88A just below the head. This ice 88A may be of a rather slushy character. For a period the mass of slush 88A grows and the head 74 rises as shown in FIG. 11 but the bubbles of gas are no longer so numerous. Nevertheless, they can act as nucleation sites encouraging thereat the formation of ice 88B in the body of the beverage, this ice 88B may be more in the nature of flakes, for example snow type flakes, which rise and agglomerate to form a flaky mass 88C of ice on the underside of the slushy ice mass 88A. As indicated in FIGS. 12 and 13 the ice flakes continue to form for a period, rise and extend the ice mass 88C downwards through the beverage 70.

Figure 14:
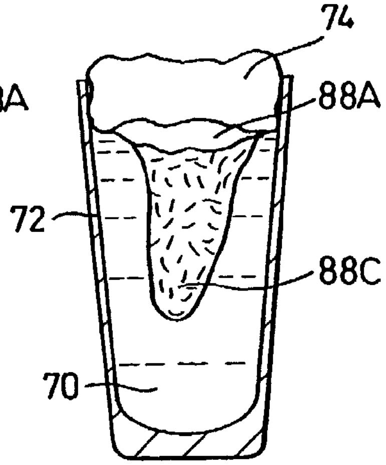

Going from the stage shown in FIG. 8 to that in FIG. 14 may only take one or two minutes so the increase in gas bubbling and the formation and visible development of the ice takes place fairly quickly and can be interesting and rather amazing phenomena to observe through the glass 72.

To enhance the theatre, drama or wonder of the event for a customer at the drinks' bar the operation of the apparatus 80 may be accompanied by an automatically (or manually actuated) occurring audible performance which may be mechanically or electrically produced using sound apparatus giving out dramatic, musical or tuneful sounds. In addition to, or as an alternative, the operation of the apparatus 80 may be, possibly automatically, accompanied by a visual lights display, for example visible flashes of light. These may simulate flashes of lightening. In that case the audible performance may comprise noise resembling thunder.

If desired, the vessel 72 when subject to the ultrasound may be concealed from the view of the customer in a bar. For example, it may be concealed from view on one or more sides in an enclosure which may be on the counter or proximate thereto, which enclosure may be represented as a "magic" or magician's box or cabinet.

Preferably, the beverage is a pale colour. For example the beverage may be a pale coloured beer, for example a lager.

Besides the ice forming in the beverage 70 being an intriguing sight, it helps show the customer the beverage is cold and that it has not been diluted by addition of ice from water other than that of the beverage.

The good head 74 provides insulation of the ice, particularly from overhead heat, which helps sustain the ice for longer and thus the duration of its cooling effect. Also the ice below the head 74, helps sustain the existence of the head which may last for ten minutes, fifteen minutes or most preferably for twenty minutes or so.

Figure 15:
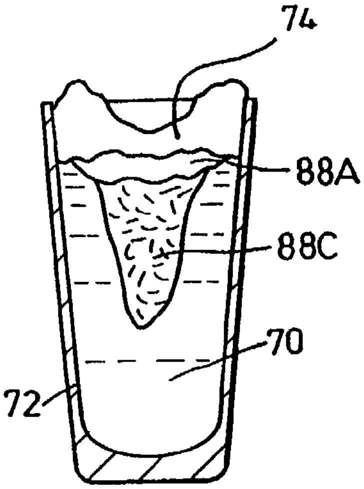

In FIG. 15, the head 74 though starting to collapse (at its centre and move away from the vessel's wall) after the elapse of some time, for example fifteen or so minutes, is still stubbornly remaining, insulating the ice and giving the beverage an attractive presentation in the vessel 72.

An alternative method of applying the ultrasound signals is represented in FIG. 16 in which after the apparatus 2 in FIG. 1 has dispensed a vessel or glass 72 of beverage 70 an ultrasound probe 90 powered through cable 92 is dipped into the beverage for emitter 84A to give out ultrasound signals. The probe 90 may be inserted into the beverage before the full measured amount is supplied to the vessel.

In FIG. 12, the dispense outlet 14 has been arranged to act as an ultrasonic probe, for example by providing it with an ultrasonic emitter 88B.

The ultrasound probe 14 in FIG. 12 may emit ultrasound signals whilst beer is passing through it to the vessel 72, and/or may become partially immersed in the beverage as shown and emit ultrasound signals into the beverage 70 in the vessel 72 whilst the measured volume of beverage is still being supplied or after it has been supplied.

FIG. 18 shows another glass 172 (for example a pint) of beverage 170 in this case lager, being excited (as indicated by arrow X) at the base only by an ultrasound emitter, for example by standing the glass of beverage in couplant (water) for example as shown in FIG. 8. FIG. 18 shows the glass 172 after it has been excited by the ultrasound for about three seconds or so, and whilst it is still being excited by ultrasound and whilst a head 174 of foam is beginning to form. As will be seen, in addition to general bubble formation at a relatively modest level throughout the volume of the beverage 170, there is increased activity in a series of horizontal "white bands" about half-way up the height of the glass 172. Interspersed between the white hands 120 are bands 122 which are less white-coloured i.e. more beverage or lager coloured. There are typically two to four white bands 120 visible, but increased bubble formation may occur above and below the "banded region" 120, 122.

The formation of the bands 120, 122 gives the glass of beverage an attractive appearance for the few seconds that they last. It is believed that they may be associated with the formation of standing waves in the glass 172 due to the ultrasound excitation, and may represent areas of the glass which might vibrate the most (although this belief is speculative and is not to be held to be limiting). The bands 120, 122 may form generally in the central height of the glass, but they may not be right at the middle—for example, they could be one-third to two-fifths of the way down from the top (or up from the bottom).

It should also be noted that the glass 172 of FIG. 18 has a mouth 124 that is narrower than a body portion 126. It is believed that having a restricted mouth forms a deeper and longer-lasting head. This may, or may not be associated with the fact that in comparison with the volume of beer contained a glass with a restricted mouth has a smaller exposed surface area of head than if it were in a vessel with straight sides, or outwardly flared sides.

Our trials indicate that best/better results can be achieved on pints of beverage than on half-pints of beverage. This may be associated with greater heat capacity of a pint of beverage in comparison with a half-pint of beverage, and the less effect exposure to the environment has/the less rapid the effect of the heat transfer to the local environment, when the ratio of volume of beverage; exposed surface is larger.

FIG. 19, illustrates the pint of lager of FIG. 18 after about three minutes have expired (or looked at another way after about ten minutes have expired—there is little change in the appearance of the glass of lager between the three minutes and the ten minutes). The head 14 is somewhat deeper than might be expected, and slightly projects above the glass 172. There is a relatively thin layer of ice 188A (of the order of a half to a few millimetres) extending under the head completely across the diameter of the glass 172 and there is a depending projection of flaky ice 188B extending down perhaps two to five centimetres into the cleared beer. The projection 188B may extend for at least three centimetres, five centimetres is not to be taken as necessarily an upper limit to its length. The projection 188B is generally central, but may be off-axis in comparison with the central axis of the glass. It has a narrower tip than it does base (the base being the portion adjacent the head 174).

It will be appreciated that creating a beverage having such an ice formation is in itself new and itself gives a visually differentiated product—which is desirable to consumers.

Moreover, creating the bands or stripes during ultrasonic excitation of the glass of beverage also creates a visually distinct product, and a differentiated mode of provision of the product to the consumer.

With reference to FIG. 20 apparatus to supply cider on draught is indicated at 202.

The draught cider is stored in a keg or cask 204. As stated above, the draught cider has a water content and a dissolved gas content.

This gas may be any suitable non-oxidising gas, for example carbon dioxide and/or nitrogen. The amount of gas dissolved in the cider may be within the usual known range for ciders.

The dissolved carbon dioxide content may be substantially 1.8% by volume, and/or the dissolved nitrogen content may be substantially 18 parts per million (p.p.m).

A pump 206 is provided to pump cider from the cask 204 through a non-return valve 207 and along a pipe 208 in a chilled python known per se (not shown); the pipe comprising a heat exchange coil 210 in a remote cooling system known per se. The pipe 208 leads to a chilling coil 212 in a bath 214 of a chiller 216, from which coil a pipe 208A leads to a manual valve 218 (known per se) of a dispense outlet or nozzle 220 which may be provided at or on a drinks' bar. Bath 214 contains an ethylene glycol and water cooling mixture 222, for example 50% glycol and 50% water. The cooling mixture 222 is cooled by an evaporator 224 of a refrigeration unit 226 comprising a condenser 228, a refrigerant pump 230, and an expansion arrangement 232. A pump 234 circulates the cold mixture 222 through piping 236 forming another python 238 with the pipe 208A.

In known manner, a blanket or atmosphere of non-oxidising gas (for example carbon dioxide and/or nitrogen) from a suitable supply 240 (via a pressure regulator 242) provides a top pressure in the cask 204 and assists the pump 206 in the extraction of cider.

The top gas pressure in the cask 204 may be substantially 206.84 $kN/m^2$ (30 $lbs/in^2$).

The pump 206 may develop a pressure in pipes 208, 208A of substantially 517.12 $kN/m^2$ to substantially 551.58 $kN/m^2$ valve (75 to 80 $lbs/in^2$). Normally pump 206 is not operating, thus when the valve 218 is opened the pump pressure stored in the pipes 208, 208A drops to below a pre-determined desired value which is observed by pressure switch 244 of a pump control (not shown) causing the pump 206 to operate to provide a pump output pressure of substantially 75 to 80 $lbs/in^2$. The chiller 216 is arranged to cool the cider passing through to the outlet nozzle 220 to a pre-determined temperature in the range of substantially −1° C. to substantially −12° C., for example −6° C. The cider reaches the nozzle 220 at that pre-determined temperature and issues therefrom into an open-topped vessel 46 (FIG. 2) which may be a drinking vessel, for example a drinking glass. In FIG. 20 the cider issuing from the outlet opening of the outlet nozzle 220 passes through a sparkler 247 (known per se). Instead of or in addition to said sparkler 247, a known orifice plate may be mounted in nozzle 220. But if desired, neither an orifice plate nor a sparkler may be fitted.

When valve 218 is closed, the pressure switch 244 observes a build-up in pressure in the pipes 208, 208A above a predetermined value and the control switches off the pump 206.

With reference to FIG. 21, the draught cider 248 is delivered from the outlet 220 (FIG. 20) into the drinking vessel 246, for example a glass which is preferably rather tall and preferably has a clear or transparent wall. Preferably the vessel 246 is chilled before it receives the cider. The vessel 246 may be chilled to a temperature of substantially 4° C. or less. For example a known bottle chiller may be used to chill the vessel to substantially 4° C. whilst a known glass froster may chill the vessel to substantially 0° C. A head of foam is shown at 250 when the vessel contains a full measured volume, for example a pint, of the cider.

Immediately the cold cider 250 is poured into the chilled vessel 246, the vessel is placed in a shallow depth of water 252 in a dish part 254 of an ultra-sound generating apparatus 256 in which the dish 254 is securely mounted or affixed against a base part 258 containing an ultra-sound emitter 260. The emitter 260 may be arranged to emit ultra-sound signals in a frequency range of substantially 20 kHz to 70 kHz. For example the cider may be subject to ultra-sound signals of a frequency of substantially 30 kHz or some other frequency selected from the aforesaid range, the water layer 252 providing an ultra-sonic transmission path or coupling. The cider 250 may be subject to the ultra-sound for any desired period, though usually a short period of a few seconds, for example substantially one to five seconds and more specifically about five seconds.

The result in a short time is shown in FIG. 22 in which the exposure to ultra-sonic signals has promoted sudden formation of bubbles of dissolved gas throughout the liquid cider 248 some bubbles 252A may be relatively large whilst others 252B may be relatively small and may tend to collect linearly in wavy lines which may snake upwardly. Also the head 250 may rise to increase its height or depth. The gas bubbles form nucleation sites encouraging the quick formation of ice in the cider 250 from water of the water content of the cider. The ice rises. It may be of a slushy character and tends to agglomerate in the lower part of and below the head 250 to form a slushy mass of ice 262 such as indicated in FIG. 23 in the cider.

Going from the stage shown in FIG. 21 to that in FIG. 23 may only take one or two minutes so that the gas bubbling and the formation and visible development of the ice takes place fairly quickly and be interesting phenomena to observe through the glass 246.

Besides the ice forming in the cider 248 being an intriguing sight, it helps show the customer the cider is cold and that it has not been diluted by addition of ice from water other than that already in the cider.

One of the most interesting features is that the head 250 on the glass of cider may last for a considerable time, i.e. several times the duration of a head on cider arising from known methods. The head 250 may last for twenty minutes or so. Its longevity may be due to (i) the mass of ice 262 acting as a seal or barrier to gas attempting to leave the liquid cider body, and/or (ii) the fact that the ice 262 is keeping the head 250 cold.

An alternative method of applying the ultra-sound signals is represented in FIG. 24, in which after the apparatus 202 in FIG. 20 has dispensed a vessel or glass 246 of cider 248 an ultra-sound probe 264 powered through cable 266 is dipped into the cider for emitter 260A to give out ultra-sound signals. The probe 264 may be inserted into the cider before the full measured amount is supplied to the vessel 246.

In FIG. 25, the dispense outlet 220 has been arranged to act as an ultra-sonic probe for example by providing it with an ultra-sonic emitter 260B. The ultra-sonic probe 220 in FIG. 25 may emit ultra-sound signals whilst cider is padding through it to the vessel 246, and/or may become partially immersed in the cider as shown and emit ultra-sound signals into the cider 248 in the vessel 246 whilst the measured volume of cider is still being supplied or after it has been supplied.

With reference to FIG. 26, the beverage chilled by apparatus 302 has a water content. It may also have a dissolved gas content so that during serving of the beverage in a vessel, for example a glass, gas may bubble out to form nucleation sites to encourage formation of ice, for example as aforedescribed, and or other means may be provided to encourage formation of nucleates or provide such sites, for example by application of ultra-sound to the beverage in the course of being dispensed or served and/or provision of nucleation encouraging material in the beverage, for example solid of particulate matter, which may be fine in size, included in the beverage prior to it being served or dispensed and/or added to a stream of beverage as it travels to a point where it is served or dispensed, and/or added to the served beverage in the vessel at or soon after the beverage has issued into said vessel. The beverage may be alcoholic or non-alcoholic. In the latter case, the beverage may be a fruit juice. Nucleation encouraging material in a fruit juice may be fragments of fruit; for example in orange juice nucleation encouraging material may comprise pieces or flakes of the flesh of the orange. If the beverage is alcoholic it may have a dissolved gas content and may be a beer or cider, for example as disclosed above, or may have little or no dissolved gas content, for example spirits, liqueurs, still wines and such.

In the apparatus 302, beverage from a suitable supply (known per se) is supplied at a suitable cool temperature by known propulsion means along an inlet line 304 surrounded by suitable insulation 306 and including a known measuring device 308 to deliver a desired known volume of the beverage to a beverage dispenser 310 comprising an outlet nozzle 312 when delivery of beverage is demanded at the dispense or outlet nozzle. The beverage or product inlet line 304 leads to a product flow line 314 which includes, a cooling coil 316, a pump 318 and a flow path 320 through a cooler 322, for example a peltier cooler, leading to the dispenser 310. The cooler 322 may be a flash cooler. When the dispenser 310 is not being required to supply beverage to a drinking vessel, for example a glass 324, beverage can pass through a path in the dispenser 310 and continue therefrom along another consecutive section of the product line 314 to a central path or tube 326 of a python or tube in tube heat exchanger 328 comprising insulation 330 and a tube 332 surrounding the product tube 326. At exit end 334 from the product tube 326, the product flow path 314 continues through a non-return valve 336 to junction 338 between the inlet line 304 and the flow line 314.

The product cooling coil 316 sits in a cooler or water bath 340 comprising an insulated tank 342, water 344 at low temperature for example substantially 0° C., known coils 346 carrying coolant cooling the water bath and covered in a mantle 348 of ice, driven water stirring means 350, and a water cooling coil 352.

Feedwater for heat transfer purposes is supplied by suitable means on water inlet line 354 appropriately insulated at 356. Inlet line 354 supplies water circulation line 358 through junction 360, the line 358 including the water cooling coil 352, a driven water pump 362 supplying water to a path 364 through the peltier cooler 322. From path 364 the water line 314 continues back to junction 360 via a non-return valve 366 and the outer tube 332 of the python 302. Between the pump 362 and the peltier cooler 322 the water line 314 bifurcates at junction 368 into another insulated line 370 comprising an electrically controlled valve 372, for example a solenoid valve controlling supply of chilled water to a U-shaped manifold 374 provided with inwardly directed jets or nozzles 376 to spray cooling jets of chilled water in the outside of the glass 324 standing on a liquid drip collector or tray 378 from which the collected liquid (water) can leave to drain through outlet 380.

The apparatus 302 includes an electrical control (not shown) and when the apparatus is in a ready to dispense beverage condition the pumps 318 and 362 can operate continuously. Beverage from a suitable supply can be supplied on inlet line 304 at a desired pre-determined cool first temperature. When a dispense demand is made, for example by pressing button 381 on dispenser 310. The control may cause valve 372 to open so that chilled water is sprayed on glass 324 to cool it. After a few seconds the control causes an electric valve, for example a solenoid valve, in the dispenser 310 to open so that the dispenser delivers a measured volume of the beverage pumped thereto as determined by the measuring device 308 and after delivery of the valve closes. At the time the dispenser commences to deliver beverage or some time before or after commencement, the control closes valve 372 to stop supply of chilling water to the nozzles 376. The beverage leaving coil 316 has been cooled therein to a second pre-determined desired temperature which is lower than said first pre-determined temperature. Just before reaching the dispenser 310 the beverage is cooled to a lower still pre-determined third temperature by the peltier cooler 322, substantially at which temperature the beverage issues into the glass 324. The beverage comprises water and said third temperature in lower than the freezing point of water. At about or shortly after, the time that the dispenser 310 automatically ceases to issue further beverage (because the desired measured amount has been dispensed) the control may open the valve 372 again for a few seconds, say one or two seconds, to again spray chilled water on the outside of the glass to clear away any condensate misting thereof so as to give a more clear view of what is occurring within the glass. The peltier cooler 322 may only be operated to cool the beverage to substantially said third pre-determined temperature at the same time or for about the duration that beverage issues from the dispenser 310.

In the glass the beverage is subject to inducement to cause or create nucleation sites whereat ice can form to produce a visual display or aforedescribed. Such inducement may be providing the beverage with a dissolved gas content which bubbles out and/or subjecting the beverage to the effect of ultra-sound, and/or supplying the beverage or adding thereto some nucleation causing means, for example solid matter (preferably innocuous and edible). The ultra-sound applied may be in the range of 20 to 40 kHz. The dispenser 310 may be part of a font which may be provided on or at a counter of a drinks' bar. Whatever, the font may be mounted side-on to a customer to give the customer a better view of the filling of the glass 324, and development therein. By side-on is meant that a pedestal or pillar part of the font is not necessarily between the customer and the glass. The maximum amount of ice formed may be up to about 25% of the beverage volume, but we believe that up to about 10% is satisfactory.

If desired, the issuing beverage may be subject to ultra-sound as described previously. In one example, an ultra-sound emitter 382 may be mounted on the nozzle 312. Also the nozzle may be bent, curved or otherwise directed so its outlet end may be close to an inner surface of the upper part of glass 324 for the issuing beverage to be directed against that inner surface.

In FIG. 27 an ultra-sound emitter 382A is disposed beyond an outlet end 312A of the nozzle 312 to apply the effect of ultra-sound to the issued beverage. The emitter 382A can be disposed about an axis of the issuing beverage stream and in the example take the form of ring, for example a torus, through which at least some of the beverage passes. The emitter 382A may be mounted (on a support arm 383, for example) so that there is no or only a minimum solid, ultra-sound transmission path between the emitter and the nozzle 312.

If desired the beverage flow line 314 may include an electrically operated valve 384, for example a solenoid valve, operated by the control to close when dispenser 310 delivers beverage.

If desired, colouring matter which may be innocuous and edible, may be added to the water which is sprayed on the glass 324 from the nozzles 376 so that glass chilling water may appear attractively coloured and/or fluorescent.

In order to keep the beverage in a ready to dispense state when it is not issuing from dispenser 310, the beverage may be continuously circulated in an idle mode around the flow line 314 (the beverage passes through the dispenser 310 without issuing from the nozzle 312) so that as the beverage returns to the coil 316 the water in the python tube 332 adds heat to the beverage to warm it up from the aforesaid third pre-determined temperature caused by the cooler 322 so as to prevent the beverage freezing. When the beverage is circulating in idle mode, if desired pump 362 may be operated at a different rate, for example a lower rate, to when the dispenser 310 is delivering beverage.

If desired, at idle mode, the control may be arranged to automatically reverse electrical current in the peltier cooler 322 whereby the latter may add some heat continuously or intermittently to beverage passing therethrough to reduce the chance of the beverage freezing. If desired, the beverage flow line 314 may comprise flow detection means and/or temperature sensing means so that if a beverage freezing up condition has arisen the control operates to cause the peltier cooler 322 to operate in reverse to add heat to the beverage flowing therethrough to prevent or reduce the chance of the beverage freezing.

The water in flow line 358 leaving the water cooling coil 352 may be at substantially said second pre-determined temperature. Thus at idle mode the beverage and cooling water in the python 328 may be at substantially same temperature.

As an example, the beverage (from a storage celler, say) may be supplied on inlet line 304 at a said first pre-determined temperature of substantially 6° to 8° C. On leaving the coil 316, the beverage second pre-determined temperature may be substantially 0° to 1° C. (e.g. 0.5° C.±0.5° C.). Water emerging from coil 352 may also be at temperature of substantially 0° C. to 1° C., but due to heat pick-up may emerge from nozzles 376 at substantially 2° C. When the apparatus 302 is in beverage issuing mode, the peltier cooler 322 cools the beverage supplied and dispensed to the dispense nozzle 312 to the third pre-determined temperature of substantially −5.0° C. (say −4.5° C.±0.5° C.). When beverage is being supplied by the dispenser 310, the temperature of water leaving the tube 332 of the python 328 may be substantially 2.0° C. Under idle mode, with cooler 322 switched off, the beverage may circulate in line 314 at a temperature of substantially 0° to 1° C. The temperatures specified in this example may be suitable when the beverage is a beer, for example a lager.

Preferably the water bath 340 and cooler 322 are disposed near to the dispenser 310 in, for example, a drinks' bar, so that the portion of flow line 314 between the water bath and dispenser is relatively short.

The glass 324 may be a tall glass having a globular or bowl shaped wide portion at its upper end, for example a tulip shape. The apparatus may be arranged so that it can only be used to dispense beverage if a certain type of glass is placed under the nozzle 312, otherwise a disabling system prevents beverage supply operation of the apparatus.

On dispensing a beverage, for example a pint of beer, for example a lager the following procedure may be followed:

(1) Press button 382 to initiate dispense mode;
(2) Spray chilling water from nozzle 376 into the outside of glass 324 for a few seconds, for example about five seconds, then
(3) Start to fill glass with the beverage and continue application of the chilling spray for a few seconds longer;
(4) Turn off the chilling spray but continue to fill glass with beverage to the desired amount;

(5) Apply ultra-sound to the beverage during last few seconds of filling, and (6) When filling stops, re-apply chilling water spray for a second or two.

The volume of beverage circulating in line 314 at idle mode may be greater than a pre-determined fixed volume the apparatus is set to dispense beverage at from nozzle 312.

With reference to FIGS. 28 to 30, the beverage chilled by apparatus 402, 502 or 602 has a water content. It may also have a dissolved gas content so that during serving of the beverage in a vessel, for example a glass, gas may bubble out to form nucleation sites to encourage formation of ice, for example, as aforedescribed, and or other means may be provided to encourage formation of nucleation sites or provide such sites, for example by application of ultra-sound to the beverage in the course of being dispensed or served and/or provision of nucleation encouraging material in the beverage, for example solid or particulate matter as aforedescribed. In the case of ultra-sound, its frequency may be as aforedescribed and applied in the manner and at the time in a serving procedure as aforedescribed. For example the apparatus 402, 502 or 602 can have dispensers a described below each with an outlet nozzle 312 such as described above with reference to FIG. 26 which may comprise an ultra-sound emitter 382 as described with reference to FIG. 26, or the nozzle 312 in FIGS. 28 to 30 may have associated therewith an ultra-sound emitter as described with reference to FIG. 27 and identified at 382A therein.

Each apparatus 402, 502 and 602 can have a respective electrical control to regulate and control operation of beverage measurement, valves and pumps.

With reference to FIG. 28, a water bath is indicated at 404 kept cool at for sample, substantially 0° C. by cooling coil 406 encased in an ice mantle 408. The water bath also includes a driven stirrer 410 and a water pump 412 driven as and when desired. A glycol bath 414 (a bath containing a mixture of water and ethylene glycol) is kept cool at, for example substantially −4.5° C. by cooling coil 416 and includes a driven stirrer 418 and a beverage pump 420. Draught beverage which may have a dissolved gas content is supplied, by any suitable means known per se at a desired low temperature, on inlet line 422 and is cooled in beverage cooling coil 424 in the water bath 404. The beverage may be a beer, for example a lager. From coil 424 the cooled beverage transfers on line 426 to another beverage cooling coil 428 in the glycol bath 414. From coil 428 the beverage travels on lines 430 and 432 to the beverage pump 420 which sends the beverage on line 434 to a dispenser 436 of a font having the outlet nozzle 312 to supply the beverage to a drinking vessel 438, for example a glass, on the drip collector 378 with the outlet 380 to drain.

When delivery of a measure volume of beverage is desired button 440 is pressed causing the control to operate the dispenser to deliver the measured volume through nozzle 312, at a desired temperature below the freezing point of water at atmospheric pressure. When beverage dispense is not required (idle mode) passage means in the dispenser 436 allows the pump 420 to circulate, preferably continuously, the beverage through line 434 and line 442 containing a non-return valve 444 to beverage coil 446 in the glycol bath 414. From coil 446 the beverage returns to the pump 420 via line 448. If desired, beverage line 434 may include a cooler 450, for example a flash cooler, which may be a peltier cooler. The cooler 450 can ensure that beverage reaches the dispenser 436 at the desired temperature, and if a peltier cooler it may be operated with reverse current to ensure circulating beverage at idle mode does not freeze in the lines 434, 442. When delivery of beverage into glass 438 is desired cold water sprays from the nozzles 376 may be applied at any desired time to the glass exterior by the control causing of valve 372 to open to supply the manifold 374 with water from the water pump 412 via line 452. The pump 412 may operate continuously. When valve 372 is closed water can return via line 454 and non-return valve 456 to a cooling coil 458 in the water bath; top-up water being provided for a suitable supply via inlet line 460. Cooled water may be circulated by the pump 412 around the lines 452, 454 which may be connected at 456 and 458 with cooler 450 if the latter is provided.

With reference to FIG. 29 in the apparatus 502, the valve 372 may comprise passage means arranged, when the valve is closed to prevent supply of cold water to the nozzles 376, to allow water from line 452 to transfer to line 454 so it may be continuously circulated by water pump 412 if desired. The glycol bath 414 which again may be at a temperature of substantially −4.5° C. includes a driven glycol pump 504. A beverage dispenser 506 is provided with the outlet nozzle 312 and beverage dispense operating button 440 connected to the control. The dispenser 506 forms part of a font also comprising a tank or chamber 510 containing a beer cooling coil 512 connected by line 514 with the beverage coil 428 in the glycol bath 414 and by line 516 to the dispenser 508 which when opened in response to operation of button 440 permits a desired measured volume of beverage, propelled by suitable known means, to be automatically dispensed at a desired temperature below the freezing point of water. Beverage coil 428 is kept cool by glycol filling the chamber 510, the glycol being pumped thereto from glycol tank 414 by the pump 504 along line 518 and returning to the glycol tank through line 520. An electrical heater or heating coil 522 is provided in the chamber 510 to heat glycol therein when desired.

Preferably the amount of glycol in chamber 510 is a minimum. Pressure observing means may be provided in the beverage coil 512. Ice formation in the beverage may be detected by a rise in beverage pressure in the coil 512, for example above a pre-determined value and/or at a rate greater than a pre-determined rate of pressure rise, and the control operated in response causing the glycol circulation pump 504 to stop and heater 522 to be switched on so as to heat glycol in the chamber 510 and beverage in the coil 512. As the temperature increases, the observed beverage pressure falls so the control responds causing the pump 504 to re-start and the heater 522 to be turned off.

If desired, a cooler 524, for example a flash cooler, which may be a peltier cooler, may be provided in line 514 to ensure the beverage reaches dispenser 508 at the desired temperature below the freezing point of water when beverage is being dispensed. If the cooler 524 is a peltier cooler it may be operated when desired with reverse current to ensure the beverage does not freeze and block the coil 512. The cooler 524 can be connected by water line 526 and 528 to water lines 452 and 454.

With reference to FIG. 30, beverage from beverage coil 424 in water bath 404, at a temperature, for example, of substantially 0° C., transfers via line 604 and beverage pump 606 to beverage coil 608 in the glycol bath 414 at a temperature, for example, of substantially −4.5° C., from which coil the beverage is supplied via line 610, comprising a cooler 612, to a beverage dispenser 614 forming part of a font and supplying the beverage outlet nozzle 312. The cooler 612 may be a flash cooler. The cooler 612 may be a peltier cooler supplied with glycol via line 616 by glycol pump 618, the glycol returning to the bath 414 on line 620. Beverage supplied on line 422 is first cooled, for example, to substantially 0° C. in the water bath 404 and, for example, to substantially −4.5° C. in the glycol bath 414. From the cooler 612 beverage is supplied to the dispenser 614 via line 622 comprising non-return valve 623. The dispenser 614 is arranged with passage means whereby, when the dispenser 614 is not supplying beverage through the nozzle 312, beverage is fed to line 624 for circulation by pump 606 around system 608, 610, 622, 624. When button 440 is operated to operate the control, the apparatus supplies a pre-determined measured volume of the beverage via outlet nozzle 312 and the beverage supply temperature, less than the freezing point of water, is controlled by the cooler 612. If beverage being circulated around the system 608, 620, 622, 624 is detected as being liable to freezing up, heat may be applied to the system; for example if the cooler 612 is a peltier cooler electric current thereto may be reversed to provide said heat. Beverage leaving the glycol bath 414 may be at a temperature of substantially −2° C. which may be the beverage re-circulation temperature. The cooler 612 may only operate to cool the beverage when beverage is to issue from nozzle 312.

The aforedescribed embodiments with reference to FIGS. 26 to 30, but more particularly with reference to FIGS. 26 and 27 may have any or each of the following features, characteristics or advantages:

(1) In the "idle mode", beer is circulated in a loop continuously. In the idle mode, the beer in all of the loop is about 0° C. In the "dispense mode" from the recirculation pump to the peltier cooler the temperature of the beer is about 0°, the peltier cooler chills the beer down to −5° or so (−5½° C.), the very cold beer then goes through the dispense solenoid and either out of the nozzle if it open, or into the python 328, where the beer is warmed up again to about 0° C.—so the beer is at −5½° C. for only part of the loop—that part that goes through the dispense solenoid. The aim is to have a safe system where it is not possible for the beer to freeze.

(2) The dispense system requires no manual intervention/holding/activity other than pressing the "start" button. This achieves consistency of dispense between successive dispense operations, and reduces the skill necessary.

(3) When the "start" button is pressed, a jet of water from the ice bath chills the glass. A little while later the peltier cooler is switched on, after five or ten seconds or so the solenoid valve opens, is switched on, and the beer comes out of the dispense tap. Once a pint or half pint is dispensed, the solenoid is closed and the peltier coder is switched off.

(4) The auto-reheat enables the system to return to a predictable stable condition before each dispense cycle. No glycol is required in the cooler 340, because the beer is not stored sub-zero for any significant length of time.

(5) The dispense apparatus will be side-on to the user, so that the user can get a good view.

(6) Ultrasound can be applied through a toroidal ring 382A spaced from the end of the nozzle, and supported on a side arm 383. Ultrasound at 20 to 40 kHz can be applied.

(7) Applying ultrasound to a stream of beverage before it joins the main body of beverage that is being created in the glass.

(8) It is surprising that there is no spillage as beverage passes through the annular ultrasound ring 382A, but the beverage has laminar flow and surface tension effects may help.

(9) A peltier cooler to cool the beverage to sub-zero temperatures for dispensing continuous circulation to avoid freezing at idle mode.

10. A chilled glass to receive dispensed beverage, the glass needs to be cold or the heat capacity of the glass can detract from the formation of ice or visual display.

11. Volume of circulating beverage can be more than the dispensed measured volume (e.g. one pint) so that a suitable glass of beverage can be dispensed substantially immediately when demanded.

12. Both the glass chilling washer and beverage dispense go at the same time, but in overlapping time frames.

(13) During dispense of a beer, for example lager there can be a substantially clear body of lager, almost to the top of the glass, and then a flash of ultrasound causes the body of lager to go cloudy as nucleation is initiated. Nucleation inducement at or near end of dispense.

(14) Colour of the glass chilling, water sprays may be changed or varied during a dispense or serving cycle, or from one dispense or serving cycle to another.

(15) The system may dispense at least two drinks per minute—30 seconds for each in order to allow for change of glass time.

(16) The chilling water sprays start, then stop and then start again during a single dispense operation—the final burst of cooling water is to achieve a cleaning effect, rather than cooling effect—i.e. the initial period of application of water is to cool the temperature of the glass down before the beverage starts to be introduced, and then there is a final clearing/cleaning application of water just as the beverage dispense stops—so that the user can see the effect taking place in a cleaned/defogged glass.

We claim:

1. A beverage dispense apparatus, comprising:

a beverage dispense outlet adapted to dispense a beverage into a vessel;

means for decreasing a temperature of a beverage prior to dispensing said beverage;

a beverage dispense station adapted to receive said vessel;

a cooling system adapted to decrease a temperature of said vessel after said beverage dispense station receives said vessel and at least one of prior to dispensing said beverage into said vessel, after dispensing said beverage into said vessel, and while dispensing at least one portion of said beverage into said vessel;

a peltier effect device, wherein at least a first portion of said beverage and at least one portion of said coolant pass through said peltier effect device, and said device is adapted to decrease a temperature of said first portion of said beverage before said first portion is dispensed into said vessel; and a vessel cooling nozzle and a communication conduit adapted to communicatively connect said at least one portion of said coolant with said vessel cooling nozzle, wherein said vessel cooling nozzle is adapted to apply said coolant onto said vessel.

2. A beverage dispense apparatus comprising:

peltier effect cooling means adapted to cool a beverage to below 0° C., a dispense tap, beverage dispense pipework adapted to convey said beverage to the dispense tap, and an ultrasonic emitter, wherein the apparatus is adapted to dispense said beverage at a temperature below the temperature at which ice would normally form in a standing beverage at atmospheric pressure subject to nucleation, and wherein said beverage in the apparatus does not freeze solid before being dispensed, and wherein the ultrasonic emitter is adapted to emit ultrasonic waves to cause nucleation of ice in said beverage during or after it is dispensed.

3. The dispense apparatus according to claim 2 in which an outlet nozzle comprises the ultrasonic emitter, or a nozzle has the ultrasonic emitter associated therewith.

4. The dispense apparatus according to claim 2 in which the ultrasound waves have a frequency in the range of 20 kHz to 70 kHz.

5. The dispense apparatus according to claim 4 in which the ultrasound waves have a frequency of substantially 30 kHz.

6. The dispense apparatus according to claim 2 in which the peltier effect cooling means is adapted to cool the beverage to between substantially −4° C. and substantially −6° C.

7. The dispense apparatus according to claim 2 in which the peltier effect cooling means is adapted to cool the beverage to between substantially −1° C. and substantially −12° C.

8. The dispense apparatus according to claim 2 which has a visible light display.

9. The dispense apparatus according to claim 2, further comprising a unit or dispenser mountable on a counter of a drinks' bar and comprising heat exchange means and an outlet.

10. The dispense apparatus according to claim 2 in which the beverage dispense pipework contains beer.

11. The dispense apparatus according to claim 2, further comprising a water line leading to a water jet or nozzle adapted to spray water onto the outside of an upright glass disposed at the dispense apparatus.

* * * * *